United States Patent
Yao et al.

(10) Patent No.: US 12,325,779 B2
(45) Date of Patent: Jun. 10, 2025

(54) CELLULOSIC PARTICLE

(71) Applicant: FUJIFILM Business Innovation Corp., Tokyo (JP)

(72) Inventors: Kenji Yao, Kanagawa (JP); Satomi Kashiwagi, Kanagawa (JP); Shota Matoba, Kanagawa (JP); Ayu Naito, Kanagawa (JP); Kazusei Yoshida, Kanagawa (JP); Yuko Iwadate, Kanagawa (JP); Masahiro Oki, Kanagawa (JP); Takahiro Ishizuka, Kanagawa (JP); Hideaki Yoshikawa, Kanagawa (JP); Tetsuya Taguchi, Kanagawa (JP); Hirokazu Hamano, Kanagawa (JP); Takeshi Iwanaga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 42 days.

(21) Appl. No.: 18/365,213

(22) Filed: Aug. 3, 2023

(65) Prior Publication Data

US 2024/0262966 A1    Aug. 8, 2024

(30) Foreign Application Priority Data

Feb. 3, 2023   (JP) ................................ 2023-015491

(51) Int. Cl.
*C08J 3/12*        (2006.01)

(52) U.S. Cl.
CPC ........... *C08J 3/126* (2013.01); *C08J 2301/12* (2013.01); *C08J 2305/02* (2013.01); *C08J 2377/04* (2013.01)

(58) Field of Classification Search
CPC ... C08J 3/126–128; C08J 2301/12; C08L 1/02
See application file for complete search history.

(56) References Cited

U.S. PATENT DOCUMENTS

2004/0043964 A1 * 3/2004 Gomi ..................... C08B 16/00
                                                              424/494

FOREIGN PATENT DOCUMENTS

| EP | 4063432 | 9/2022 | |
|----|---------|--------|---|
| EP | 4223273 | 8/2023 | |
| JP | 2020132616 | 8/2020 | |
| JP | 6872068 B1 * | 5/2021 | ........... A61K 8/0245 |
| JP | 2022099605 | 7/2022 | |
| WO | WO-2013166385 A1 * | 11/2013 | ............. A61K 31/12 |
| WO | 2022264693 | 12/2022 | |

OTHER PUBLICATIONS

Machine translation JP-6872068-B1 (Year: 2024).*
"Search Report of Europe Counterpart Application", issued on Feb. 14, 2024, pp. 1-8.
"Office Action of Europe Counterpart Application", issued on Feb. 28, 2025, p. 1-p. 7.

* cited by examiner

*Primary Examiner* — Alexandre F Ferre
(74) *Attorney, Agent, or Firm* — JCIPRNET

(57) ABSTRACT

A cellulosic particle contains cellulose as its base constituent, and the percentage water absorption of the cellulosic particle measured by method B in ISO 15512:1999 is 11% or more and 20% or less.

13 Claims, No Drawings

CELLULOSIC PARTICLE

CROSS-REFERENCE TO RELATED APPLICATIONS

This application is based on and claims priority under 35 USC 119 from Japanese Patent Application No. 2023-015491 filed Feb. 3, 2023.

BACKGROUND

(i) Technical Field

The present disclosure relates to a cellulosic particle.

(ii) Related Art

In Japanese Unexamined Patent Application Publication No. 2020-132616, "oily solid cosmetics containing surface-treated spherical cellulose powder with an average particle size of 1.0-30.0 μm." is proposed.

In Japanese Unexamined Patent Application Publication No. 2022-099605, "resin beads obtained by surface treatment of core beads formed from a resin having cellulose as a main component by a solid surface treatment agent, in which the volume-based cumulative 50% particle size is 50 μm or less, the sphericity is 0.7-1.0, the surface smoothness is 70-100%, and the degree of crystallization is 60% or less." are proposed.

SUMMARY

Aspects of non-limiting embodiments of the present disclosure relate to a cellulosic particle that contains cellulose as its base constituent and that, compared with cellulosic particles whose percentage water absorption measured by method B in ISO 15512: 1999 is less than 11% or more than 20%, may have high flexibility and may experience only a limited loss of flexibility even when exposed to a strongly acidic or strongly alkaline environment.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cellulosic particle containing cellulose as a base constituent, wherein a percentage water absorption of the cellulosic particle measured by method B in ISO 15512: 1999 is 11% or more and 20% or less.

DETAILED DESCRIPTION

Exemplary embodiments as examples of the present disclosure will now be described. These descriptions and the Examples are intended to illustrate exemplary embodiments and not intended to limit the scope of aspects of the present disclosure.

In a series of numerical ranges presented herein, an upper or lower limit specified in one numerical range may be substituted with the upper or lower limit of another numerical range in the same series. In a numerical range presented herein, furthermore, the upper or lower limit of the numerical range may be substituted with a value indicated in the Examples.

A constituent may include multiple corresponding substances.

When the amount of a constituent in a composition is mentioned herein, and if multiple substances corresponding to the constituent are present in the composition, the mentioned amount represents the total amount of the multiple substances present in the composition unless stated otherwise.

Cellulosic Particles

Cellulosic particles according to an exemplary embodiment contain cellulose as their base constituent, and the percentage water absorption of the cellulosic particle measured by method B in ISO 15512:1999 is 11% or more and 20% or less.

Configured as described above, the cellulosic particles according to this exemplary embodiment may have high flexibility and may experience only a limited loss of flexibility even when exposed to a strongly acidic or strongly alkaline environment. Possible reasons are as follows.

Resin particles are used in various fields, including cosmetics, abrasives, display spacers, chromatographic carriers, and resin additives, because of their superior characteristics and utility.

Resin particles, however, are superior in durability and do not degrade in natural environments, and thus there have been instances in recent years in which resin particles flow into the ocean and become microbead waste that negatively impacts the ecosystem.

Considering this background, there is a desire for resin particles superior in biodegradability, and cellulose has been gaining attention as one of their materials.

Cellulose is an excellent biomass and biodegradable polymeric material. To be more specific, cellulose has great potential reserves, is available worldwide, is inedible, and is a primary derivative that does not require polymerization. Cellulose is thus an excellent biomass polymeric material that essentially produces minimal $CO_2$ emission, and is an excellent biodegradable polymer that is robust in its use environments but quickly biodegrades when exposed to any of the environments of soil, compost, activated sludge, and the ocean. By virtue of such attributes, cellulose is expected as an eco-friendly polymeric material that contributes to the achievement of the SDGs (Sustainable Development Goals).

A character of cellulose, however, is its high elastic modulus and rigidity. This discourages the use of cellulose in applications requiring flexibility. An example of an application requiring flexibility is texture-improving particles for cosmetics.

For example, in Japanese Unexamined Patent Application Publication No. 2020-132616, a texture improvement by treating the surface of cellulose particles with a substance such as octyltriethoxysilane or a metallic soap is reported. With such a surface treatment, however, a texture-improving effect is admittedly observed in the initial period of use, but the surface treatment peels off over time due to weak adhesion between the cellulose particles and the surface treatment agent, making it difficult to maintain the improved texture.

In response to this, in Japanese Unexamined Patent Application Publication No. 2022-099605, it is reported that the improved texture can be maintained for an extended period by specifying the sphericity and surface smoothness of cellulosic particles and using a flat-plate-shaped surface treatment agent. The cellulosic particles and the surface treatment agent, however, are unbound, which means that the surface treatment agent peels off, and thus the texture-improving effect decreases, in strongly acidic or strongly alkaline environments, and this discourages application to products whose manufacturing process involves a strongly acidic or strongly alkaline atmosphere.

The reason why cellulose or cellulosic particles exhibit a rough texture is due to the rigidity of cellulose molecules and their extremely strong intramolecular and intermolecular hydrogen bonding strengths that result in dense packing of the rigid molecules. When water is absorbed, water molecules enter certain intermolecular spaces, creating points at which the rigid molecular chains bend. The intermolecular forces, furthermore, are weakened, and this tends to cause a transition from a rough texture to a somewhat softer texture. Specifically, by controlling the percentage water absorption of the cellulose or cellulosic particles measured by method B in ISO 15512:1999 to make it 11% or more, flexibility may be improved, and by virtue of the acid and alkaline resistance of the cellulose itself, the loss of flexibility may be limited even after exposure to a strongly acidic or strongly alkaline environment. If the percentage water absorption of the cellulosic particles measured by method B in ISO 15512: 1999 is less than 11%, the action on molecular chain bending and intermolecular forces becomes insufficiently strong, and the flexibility-improving effect is not produced.

If the percentage water absorption of the cellulose or cellulosic particles is more than 20%, however, sticky feel of water becomes significant, and the flexibility-improving effect is not achieved.

For these reasons, presumably, the cellulosic particles according to this exemplary embodiment, configured as described above, may have high flexibility and may experience only a limited loss of flexibility even when exposed to a strongly acidic or strongly alkaline environment.

The cellulosic particles according to this exemplary embodiment may have high flexibility, which means that if these particles are used in cosmetic applications, spreading and hard feels of the cosmetics may improve. In that case the sticky feel from water may also be reduced, and this may also improve spreading and hard feels of the cosmetics.

The details of the cellulosic particles according to this exemplary embodiment will now be described.

Percentage Water Absorption

The percentage water absorption of the cellulosic particles according to this exemplary embodiment measured by method B in ISO 15512:1999 is 11% or more and 20% or less. For improved flexibility and for a reduced decrease in flexibility in a strongly acidic or strongly alkaline environment, the percentage water absorption may be 11% or more and 17% or less, preferably 11% or more and 13% or less.

The percentage water absorption of the cellulosic particles is measured by method B in ISO 15512:1999.

Percentage Weight Loss

For the cellulosic particles according to this exemplary embodiment, the percentage weight loss after standing in a 28° C. and 85% RH environment for 3 days and subsequent vacuum-drying at 100° C. for 1 hour may be 18% or more and 25% or less, preferably 18% or more and 22% or less, more preferably 18% or more and 20% or less for improved flexibility and for a reduced decrease in flexibility in a strongly acidic or strongly alkaline environment.

The method for measuring the percentage weight loss of the cellulosic particles is as follows.

The cellulosic particles of interest are left to stand in an environmental room set to a temperature of 28° C. and a humidity of 85% RH for 3 days. After standing, the cellulosic particles in the environmental room are subjected to the measurement of their weight (W1). Then the cellulosic particles are vacuum-dried at 100° C. for 1 hour. The weight of the dried cellulosic particles (W2) is measured. Then the percentage weight loss of the cellulosic particles is calculated according to the following equation.

Equation: Percentage weight loss of the cellulosic particles= $((W1-W2)/W1) \times 100$ Cellulose The cellulosic particles according to this exemplary embodiment contain cellulose as their base constituent.

In this context, containing cellulose as a base constituent means that the amount of cellulose relative to the cellulosic particles is 90% by mass or more.

When the cellulosic particles have the coating and intermediate layers described later herein, containing cellulose as a base constituent means that the cellulose content relative to the core particle is 90% by mass or more.

The number-average molecular weight of the cellulose may be 37000 or more, preferably 45000 or more.

There is no particular upper limit, but for example, the number-average molecular weight of the cellulose may be 100000 or less.

By setting the number-average molecular weight of the cellulose to 37000 or more, it may be more likely that the cellulosic particles exhibit high biodegradability and experience little change in texture over time. Possible reasons are as follows.

If the number-average molecular weight of the cellulose is too low, the rate of biodegradation tends to be significantly fast, and the initial rate of biodegradation tends to be out of control. By setting the molecular weight to 37000 or more, it may be possible to reduce the chipping and deformation of the particle surface and reduce changes in texture over time. If the number-average molecular weight is too low, furthermore, the disintegration of the particles lacks uniformity because the initial biodegradation is too fast; the size will vary, and the final rate of biodegradation will be consequently slow. By setting the molecular weight to 37000 or more, it may be possible to achieve uniform disintegration of the particles; biodegradability may also be excellent.

For these reasons, presumably, it may be more certain that the cellulosic particles exhibit high biodegradability and experience little change in texture over time.

The number-average molecular weight of the cellulose is measured by gel permeation chromatography (differential refractometer, Optilab T-rEX, Wyatt Technology; multiangle light scattering detector, DAWN HELEOS II, Wyatt Technology; columns, one TSKgel α-M and one α-3000, Tosoh) with dimethylacetamide (with the addition of 0.1 M lithium chloride) as the eluent.

Extra Constituents

The cellulosic particles according to this exemplary embodiment may contain extra constituents. If the cellulosic particles have the coating layer described later herein, the extra constituents are contained in the core particle, which is covered with the coating layer.

Examples of extra constituents include plasticizers, flame retardants, compatibilizers, release agents, light stabilizers, weathering agents, coloring agents, pigments, modifiers, anti-dripping agents, antistatic agents, anti-hydrolysis agents, fillers, reinforcing agents (glass fiber, carbon fiber, talc, clay, mica, glass flakes, milled glass, glass beads, crystalline silica, alumina, silicon nitride, aluminum nitride, boron nitride, etc.), acid acceptors for preventing acetic acid release (oxides, such as magnesium oxide and aluminum oxide; metal hydroxides, such as magnesium hydroxide, calcium hydroxide, aluminum hydroxide, and hydrotalcite;

calcium carbonate; talc; etc.), and reactive trapping agents (e.g., epoxy compounds, acid anhydride compounds, carbodiimides, etc.).

The amounts of the extra constituents may be 0% by mass or more and 5% by mass or less for each constituent in relation to the total amount of the cellulosic particles (or core particles). In this context, "0% by mass" means that the extra constituent is not contained.

Cellulosic Particles Having a Coating Layer

The cellulosic particles according to this exemplary embodiment may be cellulosic particles having a core particle that contains cellulose as its base constituent (hereinafter also referred to as a cellulosic core particle) and a coating layer that covers the core particle and contains at least one selected from the group consisting of a fatty acid, a fatty acid metallic salt, and an amino acid compound (hereinafter also referred to as "cellulosic particles having a coating layer").

By configuring the cellulosic particles according to this exemplary embodiment as described above, it may be likely that the cellulosic particles have high flexibility and experience only a limited loss of flexibility even when exposed to a strongly acidic or strongly alkaline environment. A decrease in biodegradability may also be reduced. Possible reasons are as follows.

A fatty acid and a fatty acid metallic salt have a pseudo-foam structure, or exhibit a sponge-like action, resulting from the repelling of aliphatic groups between their molecules with a repulsive force, and this structure or effect may enhance the flexibility of the surface of the particles themselves. Because of low activity of the aliphatic groups toward chemical reactions, decomposition by an acid or alkaline may also be unlikely. As a result, it may be likely that flexibility is high, and that the loss of flexibility is limited even after exposure to a strongly acidic or strongly alkaline environment.

A fatty acid and a fatty acid metallic salt may also limit the hydrolysis of the cellulose by increasing hydrophobicity with their inherent strong water repellency, and this may prevent surface chipping associated with initial biodegradation of the particles and allow biodegradation to proceed uniformly. These compounds are also likely to undergo partial aggregation and thus leave gaps in the surface, and this may contribute to achieving excellent biodegradability because microorganisms can penetrate through these gaps.

An amino acid compound may be readily fastened to the surface of the cellulosic particles with its strong affinity and ability to bind with cellulose. Its inherent flexible molecular structure may enhance the flexibility of the cellulose to which it is bound. Since amino acids have only low activity with acids and alkalis, the acid and alkaline resistance of the cellulosic particles may also be strengthened. As a result, it may be likely that flexibility is high, and that the loss of flexibility is limited even after exposure to a strongly acidic or strongly alkaline environment.

An amino acid compound, furthermore, has a strong tendency to turn into flat-shaped crystals after coating; initial contact of microorganisms with the cellulose may be reduced as a result of an increase in specific surface area, and changes in texture over time may lessen as a result of delayed biodegradation. Gaps created between the crystals, furthermore, may allow for gradual penetration of microorganism, and the resulting uniform progress of biodegradation may contribute to achieving excellent biodegradability.

For these reasons, presumably, it may be likely that the cellulosic particles have high flexibility and experience only a limited loss of flexibility even when exposed to a strongly acidic or strongly alkaline environment. Presumably for these reasons, furthermore, a decrease in biodegradability may also be reduced.

For the cellulosic particles according to this exemplary embodiment, hydroxyl groups may be localized on the surface by producing the cellulose-based core particle by, for example, saponifying a cellulose acylate. This may allow the core particle to be covered with the coating layer with a high coverage.

Core Particle

The core particle contains cellulose as its base constituent.

The cellulose contained in the core particle is synonymous with the cellulose described above, and possible and preferred ranges are also the same as described above.

Coating Layer

The coating layer contains at least one selected from the group consisting of a fatty acid, a fatty acid metallic salt, and an amino acid compound.

Fatty Acid

A fatty acid is a linear-chain or branched saturated or unsaturated fatty acid. The fatty acid may be a mixture of a saturated fatty acid and an unsaturated fatty acid.

For improved flexibility and for a reduced decrease in flexibility in a strongly acidic or strongly alkaline environment, the fatty acid may be a fatty acid having 16 or more and 22 or fewer carbon atoms (C16 to C22; preferably a C18 to C20 fatty acid). Specific examples of C16 to C22 linear-chain fatty acids include behenic acid, arachidic acid, and palmitic acid.

The amount of the fatty acid may be 2% by mass or more and 15% by mass or less, preferably 5% by mass or more and 10% by mass or less, of the cellulosic particles as a whole.

Fatty Acid Metallic Salt

A fatty acid metallic salt is a linear-chain or branched saturated or unsaturated fatty acid metallic salt. The fatty acid metallic salt may be a mixture of a saturated fatty acid metallic salt and an unsaturated fatty acid metallic salt.

Examples of fatty acid metallic salts include metallic salts of C16 to C22 (preferably C18 to C20) fatty acids. Examples of metallic salts of C16 to C22 fatty acids include metallic salts of stearic acid, metallic salts of behenic acid, and metallic salts of palmitic acid.

An example of a metal in a fatty acid metallic salt is a divalent metal.

Examples of metals in linear-chain fatty acid metallic salts include magnesium, calcium, aluminum, barium, and zinc.

The amount of the fatty acid metallic salt may be 2% by mass or more and 15% by mass or less, preferably 5% by mass or more and 10% by mass or less, of the cellulosic particles as a whole.

For the fatty acid and the fatty acid metallic salt, if the number of carbon atoms is 16 or more, the fatty acid group is short, and the sponge effect, the acid resistance, and the effect of imparting alkali inertness are sufficiently strong. If the number of carbon atoms is 22 or fewer, repulsion between fatty acid groups may be reduced, the affinity of the fatty acid group for cellulose may be sufficiently high, and detachment from the cellulosic particles may be unlikely. As a result, the improvement of flexibility and the reduction of a decrease in flexibility in a strongly acidic or strongly alkaline environment may be sufficient. Biodegradability may also be sufficiently high.

Amino Acid Compound

"Amino acid compounds" refers to amino acids and amino acid derivatives.

Examples of amino acid compounds include lauryl leucine, lauryl arginine, and myristyl leucine.

The amount of the amino acid compound may be 2% by mass or more and 10% by mass or less of the cellulosic particles as a whole.

Cellulosic particles having a coating layer may have an intermediate layer between the core particle and the coating layer. The intermediate layer, furthermore, may contain at least one selected from the group consisting of a polyamine compound, a polyquaternium, a polysaccharide compound, and a polyacrylic acid.

By configuring the cellulosic particles according to this exemplary embodiment in this manner, it may be likely that the cellulosic particles have high flexibility and experience only a limited loss of flexibility even when exposed to a strongly acidic or strongly alkaline environment. Biodegradability may also be improved. Possible reasons are as follows.

Polyamine compounds have a high affinity for both cellulose and the carboxylic acid moiety of the coating layer, such as a fatty acid or fatty acid metallic salt; with a polyamine compound, therefore, it may be possible to direct the aliphatic group of the fatty acid or fatty acid metallic salt toward the surface of the coated particles, and the coating layer may produce its effects more readily. As a result, it may be likely that flexibility is high, and that the loss of flexibility is limited even after exposure to a strongly acidic or strongly alkaline environment. A decrease in biodegradability may also be reduced.

With a polyquaternium, too, it may be likely that flexibility is high, and that the loss of flexibility is limited even after exposure to a strongly acidic or strongly alkaline environment, through the same action as with a polyamine compound. A decrease in biodegradability may also be reduced.

As for a polysaccharide compound, its entire molecule covers a greater portion of the cellulose because of its significant structural similarity to cellulose, but the resulting layer is partially porous like a cushion, and the coating layer, such as a fatty acid or fatty acid metallic salt, fits the surface of it. As a result, it may be likely that flexibility is high, and that the loss of flexibility is limited even after exposure to a strongly acidic or strongly alkaline environment. A decrease in biodegradability may also be reduced.

A polyacrylic acid has a moderate degree of water absorptivity and thus, by taking water into its molecule, may fit the surface of the cellulose without reducing flexibility; the polyacrylic acid may enhance the effects of the coating layer by interacting with the fatty acid or fatty acid metallic salt, for example, by virtue of its polarity close to that of fatty acids and fatty acid metallic salts. As a result, it may be likely that flexibility is high, and that the loss of flexibility is limited even after exposure to a strongly acidic or strongly alkaline environment. A decrease in biodegradability may also be reduced.

For these reasons, presumably, it may be likely that the cellulosic particles have high flexibility and experience only a limited loss of flexibility even when exposed to a strongly acidic or strongly alkaline environment. Presumably for these reasons, furthermore, a decrease in biodegradability may also be reduced.

"Polyamine compound" is a generic term for aliphatic hydrocarbons having two or more primary amino groups.

Examples of polyamine compounds include a polyalkyleneimine, polyallylamine, polyvinylamine, and polylysine.

The polyalkyleneimine may be a polyalkyleneimine possessing a constituent unit having a C1 to C6 (preferably C1 to C4, more preferably C1 or C2), preferably polyethyleneimine, for improved biodegradability.

Examples of polyallylamines include homopolymers or copolymers of allylamine, allylamine amidosulfate, diallylamine, dimethylallylamine, etc.

Examples of polyvinylamines include polyvinylamines manufactured by hydrolyzing poly(N-vinylformamide) with an alkali, and a specific example is Mitsubishi Chemical's "PVAM-0595B."

The polylysine may be polylysine extracted from a natural substance, may be polylysine produced by a transformed microorganism, or may be chemically synthesized polylysine.

The amount of the polyamine compound may be 0.2% by mass or more and 2% by mass or less of the cellulosic particles as a whole.

Examples of polyquaterniums include polyquaternium-6, polyquaternium-7, polyquaternium-10, polyquaternium-11, polyquaternium-51, polyquaternium-61, and polyquaternium-64.

The amount of the polyquaternium may be 0.2% by mass or more and 2% by mass or less of the cellulosic particles as a whole.

The amount of the polyacrylic acid may be 0.2% by mass or more and 2% by mass or less of the cellulosic particles as a whole.

Amounts of Constituents in the Coating and Intermediate Layers

The total amount of the fatty acid, fatty acid metallic salt, and amino acid compound relative to the entire coating layer may be 90% by mass or more and 100% by mass or less, preferably 95% by mass or more and 100% by mass or less.

The total amount of the polyamine compound, polyquaternium, polysaccharide compound, and polyacrylic acid relative to the entire intermediate layer may be 90% by mass or more and 100% by mass or less, preferably 95% by mass or more and 100% by mass or less.

External Additive

For the cellulosic particles according to this exemplary embodiment, inorganic particles as an external additive may be present on them. When inorganic particles are present as an external additive, secondary aggregation between particles may be reduced, and thus the particles may exhibit their intrinsic characteristics more readily. As a result, presumably, it may be likely that the cellulosic particles have high flexibility and experience only a limited loss of flexibility even when exposed to a strongly acidic or strongly alkaline environment. Presumably, a decrease in biodegradability may also be reduced.

An example of an external additive is at least one selected from the group consisting of silicon-containing compound particles and metal oxide particles.

"Silicon-containing compound particles" indicates particles containing silicon.

The silicon-containing compound particles may be particles of silicon or may be particles containing silicon and one or more other elements.

The silicon-containing compound particles may be silica particles. The silica particles can be any particles containing silica, or $SiO_2$, as their base constituent and may be crystalline or amorphous. The silica particles, furthermore, may be particles manufactured from a silicon compound, such as waterglass or an alkoxysilane, as a raw material or may be particles obtained by crushing quartz.

As for metal oxides, oxides of metals other than silicon can be applied.

Examples of metal oxides include zinc oxide, magnesium oxide, iron oxide, and aluminum oxide.

The volume-average particle diameter of the external additive may be 1 nm or more and 100 nm or less, preferably 5 nm or more and 30 nm or less, for texture (specifically, feel when touched) reasons.

The volume-average particle diameter of the external additive is measured in the same manner as the volume-average particle diameter of the cellulose.

The amount of the external additive may be 0.1% by mass or more and 2% by mass or less of the mass of the cellulosic particles (the cellulosic particles without the external additive on them) as a whole.

Volume-Average Particle Diameter and Upper Geometric Standard Deviation by Number GSDv The volume-average particle diameter of the cellulosic particles according to this exemplary embodiment may be 3 μm or more and less than 10 μm, preferably 4 μm or more and 9 μm or less, more preferably 5 μm or more and 8 μm or less.

By setting the volume-average particle diameter of the cellulosic particles according to this exemplary embodiment to 3 μm or more and less than 10 μm, it may be likely that the cellulosic particles have high flexibility and experience only a limited loss of flexibility even when exposed to a strongly acidic or strongly alkaline environment. A decrease in biodegradability may also be reduced. Possible reasons are as follows.

When the volume-average particle diameter is 3 μm or more, flexibility may tend to be excellent by virtue of reduced influence of the hard, central core portion of the particles, and the total area of contact with an acid or alkali may be prevented from being too large. As a result, a decrease in flexibility after exposure to a strongly acidic or strongly alkaline environment may be reduced.

When the volume-average particle diameter is less than 10 μm, flexibility may tend to be excellent because the flexibility may be produced with water absorption into the very surface, and it may be unlikely that part of the surface is damaged by an acid or alkali. As a result, a decrease in flexibility after exposure to a strongly acidic or strongly alkaline environment may be reduced. By virtue of a moderately large surface area, furthermore, biodegradation, which starts at the surface, may be likely to progress uniformly, and biodegradability may tend to be excellent.

For these reasons, presumably, it may be likely that the cellulosic particles have high flexibility and experience only a limited loss of flexibility even when exposed to a strongly acidic or strongly alkaline environment. Presumably for these reasons, furthermore, a decrease in biodegradability may also be reduced.

The upper geometric standard deviation by number GSDv of the cellulosic particles according to this exemplary embodiment may be 1.0 or greater and 1.7 or less, preferably 1.0 or greater and 1.5 or less, more preferably 1.0 or greater and 1.3 or less.

When the upper geometric standard deviation by number GSDv of the cellulosic particles according to this exemplary embodiment is 1.0 or greater and 1.7 or less, it may be likely that the cellulosic particles have high flexibility and experience only a limited loss of flexibility even when exposed to a strongly acidic or strongly alkaline environment. A decrease in biodegradability may also be reduced. Possible reasons are as follows.

When the GSDv is 1.0 or greater and 1.7 or less, decreases in flexibility, acid resistance, and alkali resistance caused by secondary aggregation of fine particles may be reduced because in that case the amounts of fine particles and coarse particles may be small.

The inhibition of biodegradation (which starts at the surface) by coarse particles (large particles greater than 10 μm) may also be unlikely to occur.

For these reasons, presumably, it may be likely that the cellulosic particles have high flexibility and experience only a limited loss of flexibility even when exposed to a strongly acidic or strongly alkaline environment. Presumably for these reasons, furthermore, a decrease in biodegradability may also be reduced.

The volume-average particle diameter and the upper geometric standard deviation GSDv of the cellulosic particles are measured as follows.

Particle diameters are measured using the LS particle size distribution analyzer "Beckman Coulter LS13 320 (Beckman Coulter)," and the cumulative distribution of particle diameters is plotted as a function of volume starting from the smallest diameter; then the particle diameter at which the cumulative percentage is 50% is determined as the volume-average particle diameter.

Separately, the cumulative distribution of particle diameters is plotted as a function of volume starting from the smallest diameter; the particle diameter at which the cumulative percentage is 50% is defined as the number-average particle diameter, D50v, and the particle diameter at which the cumulative percentage is 84% is defined as particle diameter D84v by number. The upper geometric standard deviation by number GSDv is calculated according to the equation $GSDv=(D84v/D50v)^{1/2}$.

Sphericity

The sphericity of the cellulosic particles according to this exemplary embodiment may be 0.7 or greater, preferably 0.8 or greater, more preferably 0.9 or greater.

By setting the sphericity of the cellulosic particles according to this exemplary embodiment to 0.7 or greater, it may be likely that the cellulosic particles have high flexibility and experience only a limited loss of flexibility even when exposed to a strongly acidic or strongly alkaline environment. A decrease in biodegradability may also be reduced. Possible reasons are as follows.

When the sphericity is 0.7 or greater, anisotropy may be reduced in flexibility and in acid and alkali resistance, and secondary aggregation of the particles may also be unlikely to occur. Decomposition by microorganisms, furthermore, may proceed along the most efficient path, from the surface toward the inner core, and biodegradability may tend to be excellent.

For these reasons, presumably, it may be likely that the cellulosic particles have high flexibility and experience only a limited loss of flexibility even when exposed to a strongly acidic or strongly alkaline environment. Presumably for these reasons, furthermore, a decrease in biodegradability may also be reduced.

Sphericity is given by (circumference of the equivalent circle)/(circumference) [(circumference of a circle having the same projected area as the particle's image)/(circumference of the particle's projected image)]. Specifically, sphericity is a value measured by the following method.

First, the cellulosic particles of interest are sampled by aspiration in such a manner that the sample will form a flat stream, and this flat stream is photographed with a flash to capture the figures of the particles in a still image; then the sphericity is determined by analyzing the particle images using a flow particle-image analyzer (Sysmex Corp. FPIA-3000). The number of particles sampled in determining the sphericity is 3500.

If the cellulosic particles have an external additive, the cellulosic particles of interest are dispersed in water containing a surfactant, then the dispersion is sonicated to give cellulosic particles from which the external additive has been removed, and the resulting cellulosic particles are used as the subject of measurement.

Surface Smoothness

The surface smoothness of the cellulosic particles according to this exemplary embodiment may be 50% or more, preferably 60% or more and 99% or less, more preferably 70% or more and 98% or less.

By setting the surface smoothness of the cellulosic particles according to this exemplary embodiment to 50% or more, it may be likely that the cellulosic particles have high flexibility and experience only a limited loss of flexibility even when exposed to a strongly acidic or strongly alkaline environment. A decrease in biodegradability may also be reduced. Possible reasons are as follows.

When the smoothness is 50% or more, a decrease in flexibility caused by hardening of protrusions on the surface of the particles may tend to be reduced. Biodegradability, furthermore, may tend to be excellent; biodegrading microorganisms include species relatively large in size, and the particle surface in that case may be accessible even to such large microorganisms.

For these reasons, presumably, it may be likely that the cellulosic particles have high flexibility and experience only a limited loss of flexibility even when exposed to a strongly acidic or strongly alkaline environment. Presumably for these reasons, furthermore, a decrease in biodegradability may also be reduced.

The surface smoothness is measured through a procedure as described below.

An SEM image (magnification, 5,000 times) of the cellulosic particles, taken with a scanning electron microscope (SEM), is observed, and the smoothness M of the individual cellulosic particles is calculated according to the equation below. The arithmetic mean of the smoothness values M of ten or more randomly chosen cellulosic particles is reported as the surface smoothness. The closer the value of the smoothness M is to 1, the closer the surface of the cellulosic particles is to smoothness.

$$M=(1-(S3)/(S2))\times 100$$

In this equation, S2 indicates the area that the cellulosic particle occupies in the image (projected area), and S3 indicates, when the cellulosic particle in the image and a circle having a projected area equal to S2 are superimposed, the sum of "the area outside the outline of the circle having a projected area equal to S2 and inside the outline of the cellulosic particle in the image" and "the area inside the outline of the circle having a projected area equal to S2 and outside the outline of the cellulosic particle in the image."

The method for superimposing the cellulosic particle in the image and a circle having a projected area equal to S2 is as follows.

The superposition is carried out in such a manner that when the cellulosic particle in the image and the circle having a projected area equal to S2 are superimposed, the area of the region shared by the two images (the area inside the outline of the circle having a projected area equal to S2 and inside the outline of the cellulosic particle in the image) is maximized.

Method for Manufacturing the Cellulosic Particles

An example of a method for manufacturing the cellulosic particles according to this exemplary embodiment is as follows.

Cellulosic Particle (core particle) Production Step
(1) First, cellulose acylate solution A is prepared by dissolving a cellulose acylate in water-dissolving organic solvent A.
(2) Then cellulose acylate solution B is prepared by adding cellulose acylate solution A into a calcium carbonate dispersion, in which calcium carbonate has been dispersed in water, and stirring the resulting mixture.
(3) Then cellulose acylate solution C is prepared by adding cellulose acylate solution B to a mixed solution of carboxymethylcellulose, water-dissolving organic solvent B, and water and rapidly stirring the resulting mixture.
(4) Then sodium hydroxide is added to cellulose acylate solution C. Subsequently, cellulose acylate dispersion C is heated to remove water-dissolving organic solvents A and B. and hydrochloric acid is added to cause the formation of cellulose acylate particles. Then the cellulose acylate particles are isolated by filtration, and the isolated cellulose acylate particles are dispersed in water; in this manner, a cellulose acylate particle dispersion is prepared.
(5) Then a cellulosic particle suspension is prepared by adding sodium hydroxide to the cellulose acylate particle dispersion and subsequently saponifying the cellulose acylate particles by warming the cellulose acylate particle dispersion in a weakly alkaline environment with stirring.
(6) Then the pH of the cellulosic particle suspension is adjusted to near neutral (e.g., 6.5 or higher and 7 or lower) by adding hydrochloric acid to the suspension, and subsequently isolation by filtration and washing in purified water of the cellulosic particles are repeated. After the electrical conductivity of the filtrate reaches 10 µs/cm or less, the isolated cellulosic particles are dried.

By controlling parameters such as the amount of hydrochloric acid for the formation of cellulose acylate particles, the stirring time in the saponification, and the pH of the cellulosic particle suspension after the saponification in the above manufacturing process, cellulosic particles according to this exemplary embodiment are obtained.

In the foregoing, a cellulose acylate is a cellulose derivative in which at least one of the hydroxy groups of cellulose has been replaced with an aliphatic acyl group (acylated). Specifically, a cellulose acylate is a cellulose derivative in which at least one of the hydroxy groups of cellulose has been replaced with —CO—$R^{AC}$ ($R^{AC}$ represents an aliphatic hydrocarbon group).

Water-dissolving organic solvent A is a solvent in which 0.1% by mass or more and 10% by mass or less, in relation to the solvent, of water dissolves at 25° C., and examples include ethyl acetate and butyl acetate.

Water-dissolving organic solvent B is a solvent in which 0.1% by mass or more and 10% by mass or less, in relation to the solvent, of water dissolves at 25° C., and examples include methyl ethyl ketone and acetone.

Intermediate Layer and Coating Layer Formation Step

If cellulosic particles having a coating layer are manufactured, a step of forming the coating layer (coating layer formation step) may be included after the above cellulosic particle (core particle) production step.

If the coating layer formation step is carried out, the coating layer is formed using the particles obtained through the above cellulosic particle (core particle) production step as the core particles.

First, an aqueous dispersion in which the core particles have been dispersed is prepared. Before preparing the aqueous dispersion, the core particles may be cleaned with an acid.

Then the aqueous dispersion in which the core particles have been dispersed and an aqueous solution containing the compound that will form the intermediate layer are mixed together. Through that, the intermediate layer is formed, for example as a result of reaction between hydroxyl groups in the resin contained in the core particles and amine sites, carboxyl groups, amino groups, or any other moiety of the compound that will form the intermediate layer or as a result of hydrogen bonding between hydroxyl groups. Then the aqueous dispersion in which the core particles with the intermediate layer formed thereon are dispersed and an emulsion containing the compound that will form the coating layer are mixed together. Through that, the coating layer is formed.

If no intermediate layer is formed, the coating layer is formed by mixing together an aqueous dispersion in which the core particles obtained through the above cellulosic particle (core particle) production step have been dispersed and an emulsion containing the compound that will form the coating layer.

Then, from the mixture, the cellulosic particles having a coating layer are removed. The removal of the cellulosic particles having a coating layer is performed by, for example, filtering the mixture. The removed cellulosic particles having a coating layer may be washed with water. Through that, unreacted surface-treating polymers can be eliminated. Then, by drying the cellulosic particles having a coating layer, cellulosic particles according to this exemplary embodiment are obtained.

Addition Step

To the resulting cellulosic particles, an external additive may be added.

An example of an addition step is a treatment in which the external additive is added to the cellulosic particles using equipment like a mixing mill, V-blender, Henschel mixer, or Lödige mixer.

Applications

Applications of the cellulosic particles according to this exemplary embodiment include granular materials for use as cosmetics, a rolling agent, an abrasive, a scrubbing agent, display spacers, a material for bead molding, light-diffusing particles, a resin-strengthening agent, a refractive index control agent, a biodegradation accelerator, a fertilizer, water-absorbent particles, toner particles, and anti-blocking particles.

An application of the cellulosic particles according to this exemplary embodiment may be cosmetics.

In particular, an application of the cellulosic particles according to this exemplary embodiment may be a cosmetic additive.

The cellulosic particles according to this exemplary embodiment may be superior in flexibility; when they are used as a cosmetic additive, therefore, it may be likely that the spreading and hardness of the cosmetic on the skin to which the cosmetic is applied are good.

The cellulosic particles according to this exemplary embodiment can be applied as cosmetic additives, for example to base makeup cosmetics (e.g., foundation primer, concealer, foundation, and face powder); makeup cosmetics (e.g., lipstick, lip gloss, lip liner, blusher, eyeshadow, eyeliner, mascara, eyebrow powder, nail products, and nail care cosmetics); and skincare cosmetics (e.g., face wash, facial cleanser, toner, milky lotion, serum, face packs, face masks, and cosmetics for the care of the eye and mouth areas).

In particular, the resin particles according to this exemplary embodiment may be used as a cosmetic additive to makeup cosmetics because flexibility and biodegradability may be required in such an application.

EXAMPLES

Examples will now be described, but no aspect of the present disclosure is limited to these examples. In the following description, "parts" and "%" are all by mass unless stated otherwise.

Preparation of Materials

The following materials are prepared.

Cellulose Acylates

CA-1: Daicel Corporation's "L50," diacetyl cellulose, weight-average molecular weight=8,000

CA-2: Daicel Corporation's "L20," diacetyl cellulose, weight-average molecular weight=47,000

CA-3: Eastman Chemical "CAP482-20," cellulose acetate propionate, weight-average molecular weight=75,000

CA-4: Eastman Chemical "CAB381-20," cellulose acetate butyrate, weight-average molecular weight=70,000

CA-5: Eastman Chemical "CA398-6," diacetyl cellulose, weight-average molecular weight=35,000

Coating Layer Formation Materials

Fatty Acids

ST-1: NOF Corporation's "NAA-222S," behenic acid (saturated fatty acid), the number of carbon atoms=22

ST-2: NOF Corporation's "NAA-180," stearic acid (saturated fatty acid), the number of carbon atoms=18

ST-3: Miyoshi Oil & Fat Co., Ltd.'s "Palmitic Acid 98," palmitic acid (saturated fatty acid), the number of carbon atoms=16

ST-4: NOF Corporation's "NAA-142," myristic acid (saturated fatty acid), the number of carbon atoms=14

ST-5: Tokyo Chemical Industry Co., Ltd.'s "Lignoceric Acid," lignoceric acid (saturated fatty acid), the number of carbon atoms=24

ST-6: NOF Corporation's "EXTRA OS-85," oleic acid (unsaturated fatty acid with a degree of unsaturation of 1), the number of carbon atoms=18

ST-7: NOF Corporation's "Linoleic Acid 90," linoleic acid (unsaturated fatty acid with a degree of unsaturation of 2), the number of carbon atoms=18 Fatty Acid Metallic Salts ST-8: NOF Corporation's "CALCIUM STEARATE VEGETABLE," calcium stearate (saturated fatty acid metallic salt), the number of carbon atoms=18

ST-9: NOF Corporation's "MAGNESIUM STEARATE S," magnesium stearate (saturated fatty acid metallic salt), the number of carbon atoms=18

ST-10: Nitto Chemical Industry Co., Ltd.'s "CS-7," calcium behenate (saturated fatty acid metallic salt), the number of carbon atoms=22

ST-11: NOF Corporation's "NONSOUL PK-1," potassium palmitate (saturated fatty acid metallic salt), the number of carbon atoms=16

ST-12: NOF Corporation's "POWDER BASE M," zinc myristate (saturated fatty acid metallic salt), the number of carbon atoms=14

ST-13: Tokyo Chemical Industry Co., Ltd.'s "Calcium Lignocerate," calcium lignocerate (saturated fatty acid metallic salt), the number of carbon atoms=24

ST-14: NOF Corporation's "NONSOUL ON-1N," sodium oleate (unsaturated fatty acid metallic salt with a degree of unsaturation of 1), the number of carbon atoms=18

ST-15: Nitto Chemical Industry Co., Ltd.'s "BS-5," barium linoleate (unsaturated fatty acid metallic salt with a degree of unsaturation of 2), the number of carbon atoms=18

Amino Acid Compounds

ST-16: Ajinomoto Co., Inc.'s "AMIHOPE LL," lauroyl lysine

ST-17: Yoneyama Yakuhin Kogyo Co., Ltd.'s "Glycylglycine," glycylglycine

ST-18: New Japan Chemical Co., Ltd.'s "DL-ALA-NINE," alanine

Silane Compound

ST-19: Shin-Etsu Chemical Co., Ltd.'s "KBE-3083," octyltriethoxysilane Intermediate Layer Formation Materials Polyamine Compounds AA-1: Nippon Shokubai Co., Ltd.'s "PEI-1500," polyethyleneimine AA-2: BASF Japan Ltd.'s "Dehyquart H81," PEG-15 cocopolyamine AA-3: Ichimaru Pharcos Co., Ltd.'s "Polylysine 10," poly-ε-lysine Polyquaterniums AA-4: Nouryon Japan K.K.'s "CELQUAT SC230M," polyquaternium 10

AA-5: BASF Japan Ltd.'s "Luviquat PQ11AT1," polyquaternium 11

Polysaccharide Compounds

AA-6: Sumitomo Pharma Food & Chemical Co., Ltd.'s "GLYLOID 6C," Tamarindus Indica seed gum AA-7: Sumitomo Pharma Food & Chemical Co., Ltd.'s "RHABALL GUM CG-M," cationized guar gum Arginine AA-8: Ajinomoto Co., Inc.'s "L-Arginine, C grade," arginine Polysaccharide Compound AA-9: Koyo Chemical Co., Ltd.'s "KOYO Chitosan FLA-40," chitosan Dextrin AA-10: San-ei Sucrochemical Co., Ltd.'s "NSD300A," dextrin Polysaccharide Compound AA-11: Hayashibara Co., Ltd.'s "PULLULAN (cosmetic grade)," pullulan Polyacrylic Acids AA-12: Toagosei Co., Ltd.'s "JURYMER AC-10H," a polyacrylic acid, weight-average molecular weight=150,000

AA-13: Toagosei Co., Ltd.'s "JURYMER AC-10SH," a polyacrylic acid, weight-average molecular weight=1,000,000

External Additives

EA-1: Wacker Asahikasei Silicone Co., Ltd.'s "HDK N20," silica particles, volume-average particle diameter=200 nm EA-2: Wacker Asahikasei Silicone Co., Ltd.'s "HDK T30," silica particles, volume-average particle diameter=300 nm The volume-average particle diameters of the external additives are measured through the same procedure as the volume-average particle diameters of the cellulosic particles.

Examples 1 to 64 and Comparative Examples 1 to 8

Cellulose Acylate Formation

The cellulose acylate of the species and amount (parts) indicated in Table 1 is dissolved in 1000 parts by mass of ethyl acetate. The resulting solution, solution A, is added to a dispersion in which calcium carbonate in the amount (parts) indicated in Table 1 has been dispersed in 500 parts by mass of purified water, and the resulting mixture is stirred for 5 hours.

Then the resulting solution, solution B, is added to a dispersion in which carboxymethylcellulose in the amount (parts) indicated in Table 1 and 300 parts by mass of methyl ethyl ketone have been dispersed in 800 parts by mass of purified water, and the resulting mixture is stirred for 10 minutes using a high-speed emulsifier.

Then sodium hydroxide in the amount (parts) indicated in Table 1 is added to the resulting solution, solution C, the resulting mixture is stirred for the time indicated in Table 1 at 80° C. to remove the ethyl acetate and methyl ethyl ketone, and subsequently diluted hydrochloric acid in the amount (parts) indicated in Table 1 is added to dissolve the calcium carbonate and form cellulose acylate particles. Then the particles are isolated by filtration, and the isolated particles are dispersed again in purified water to give a slurry of cellulose acylate particles.

Saponification of Cellulose Acylate Particles

A 20% aqueous solution of sodium hydroxide in the amount (parts) indicated in Table 1 is added to 500 parts by mass of the slurry of cellulose acylate particles (solids content, 50 parts by mass), and saponification is performed by stirring the resulting mixture at the reaction temperature and for the time indicated in Table 1 to form cellulosic particles.

Then hydrochloric acid is added dropwise to the resulting slurry of cellulosic particles until the pH of the slurry reaches the pH in Table 1. Subsequently, the slurry is filtered, the residue is washed with an excess of purified water, and the filtration and washing are repeated until the electrical conductivity of the filtrate reaches 10 μs/cm or less. The final cake of residue is filtered, and the resulting residue is lyophilized to give cellulosic particles (core particles).

Surface Treatment

In certain Examples and Comparative Examples, the cellulosic particles obtained through the saponification of cellulose acylate particles are used as core particles, and the core particles are subjected to the surface treatment described below.

The cake of residue after the repeated filtration and washing until the electrical conductivity of the filtrate reaches 10 μs/cm or less is reslurried with purified water to give a slurry of the core particles.

Then the intermediate layer formation material of the type and amount indicated in Table 1 is added to 500 parts by mass of the slurry of the core particles (solids content, 50 parts by mass), and the resulting mixture is stirred for 3 hours at 30° C. Through that, a coating layer is formed on the surface of the core particles.

Then, according to Table 1, an emulsified form of the coating layer formation material of the type and amount indicated in Table 1 is added to the slurry of core particles having an intermediate layer, and the resulting mixture is stirred for 24 hours. Through that, an intermediate layer is formed on the surface of the core particles having an intermediate layer.

Then the slurry of core particles having intermediate and coating layers is filtered, the residue is washed with purified water, and the resulting slurry is filtered again. This operation is repeated, and when the electrical conductivity of the filtrate reaches 10 μs/cm or less, the residue is lyophilized to give cellulosic particles having intermediate and coating layers. In addition, the treated surface of the cellulosic particles having intermediate and coating layers is smoothened by stirring the particles using FM Mixer (FM40, Nippon Coke & Engineering) for 3 hours at a frequency of 2000 min-1 while the mixer temperature is maintained at 25° C.

Then the external additive of the type and amount (parts) indicated in Table 1 is added to 100 parts of the cellulosic particles having intermediate and coating layers, and the materials are mixed together using a mixing mill (WONDER CRUSHER, Osaka Chemical) to give cellulosic particles having an external additive.

In certain Examples and Comparative Examples, cellulosic particles composed of a core particle and a coating layer formed thereon without an intermediate layer or cellulosic particles composed of a core particle, a coating layer formed thereon without an intermediate layer, and a subsequently added external additive are produced.

Comparative Examples 9 to 13

The following particles are used as cellulosic particles of these Comparative Examples.

Comparative Example 9

CELLULOBEADS D10 (Daito Kasei, cellulosic particles containing cellulose as their base constituent. No intermediate layer, no coating layer, and no external additive.)

Comparative Example 10

CELLUFLOW C25 (JNC, cellulosic particles containing cellulose as their base constituent. No intermediate layer, no coating layer, and no external additive.)

Comparative Example 11

CELLUFLOW T25 (JNC, cellulosic particles containing cellulose acetate as their base constituents. No intermediate layer, no coating layer, and no external additive.)

Comparative Example 12

OTS-0.5A CELLULOBEADS D10 (Daito Kasei, cellulosic particles having a core particle containing cellulose as its base constituent and a coating layer containing triethoxyoctylsilane. No external additive.)

Comparative Example 13

S-STM CELLULOBEADS D-5 (Daito Kasei, cellulosic particles having a core particle containing cellulose as its base constituent and a coating layer containing magnesium stearate. No external additive.)

Comparative Example 14

Cellulosic particles are obtained according to the procedure described in Example 1 in Japanese Patent No. 6921293. The specific production process is as follows.

An oil phase is prepared by dissolving 150 parts of cellulose acetate (trade name "CA-398-6," Eastman Chemical; the percentage of acetyl groups, 39.8%) in 1,350 parts of ethyl acetate (solubility in water, 8 g/100 g). A water phase is prepared by dissolving 100 parts of polyvinyl alcohol in 1,250 parts of deionized water. The oil phase is added to the prepared water phase, the two phases are mixed together, and the resulting mixture is stirred for 3 minutes at 1,000 rpm using a dissolver. The mixture is further stirred for 10 minutes at 2,000 rpm using a dissolver to give a suspension in which oil droplets are uniformly dispersed. The volume-average particle diameter of the oil droplets measured through observation under an optical microscope and image analysis is 18 μm.

While the resulting suspension is stirred at 500 rpm using a dissolver, 42,000 parts of deionized water is introduced over 90 minutes to give a resin particle dispersion. After filtration and washing, the resin particles are deflocculated in deionized water and stirred. The resin particles are collected by filtration and washed, and the washed resin particles are dispersed in 2,500 parts of deionized water. The pH is adjusted to 13.0 or lower by adding sodium hydroxide, and hydrolysis is performed through heating to 50° C. After the end of the hydrolysis, the dispersion is neutralized with hydrochloric acid. After filtration and washing, the product is deflocculated in deionized water. Then, after filtration and washing, drying and crushing are performed to give core beads having a median diameter (D50) of 9 μm.

Fifty grams of the resulting core beads and 1.5 g of zinc stearate (trade name "SPZ-100F." Sakai Chemical Industry; a powder of sheet-shaped particles; average particle diameter, 0.4 μm; thickness, 0.1 μm; aspect ratio, 3) are put into a small-sized mixer. The surface of the core beads is treated with the zinc stearate through dry mixing for 3 minutes to give resin beads.

The resulting resin beads are used as cellulosic particles of Comparative Example 14.

Comparative Example 15

Cellulosic particles are obtained according to the procedure described in Example 2 in Japanese Patent No. 6921293. The specific production process is as follows.

Resin beads are obtained in the same manner as in Example 1 in Japanese Patent No. 6921293, except that 2.5 g of magnesium stearate (trade name "SPX-100F," Sakai Chemical Industry; a powder of sheet-shaped particles; average particle diameter, 0.7 μm; thickness, 0.1 μm; aspect ratio, 4) is used instead of the zinc stearate.

The resulting resin beads are used as cellulosic particles of Comparative Example 15.

TABLE 1

| | | Cellulosic core particles | | | | | | | | | | |
|---|---|---|---|---|---|---|---|---|---|---|---|---|
| | | Cellulose acylate particle formation | | | | | | | Saponification of cellulose acylate particles | | | |
| | | Cellulose acylate | | Calcium | | Sodium | | Diluted hydrochloric | 20% aqueous solution of sodium | | | |
| | Particle number | Compound species | Parts by mass | carbonate Parts by mass | Carboxy-methylcellulose Parts by mass | hydroxide Parts by mass | Stirring time hr | acid Parts by mass | hydroxide Parts by mass | Reaction temperature °C. | Stirring time hours | pH — |
| Example 1 | PTC-1 | CA1 | 200 | 60 | 5 | 10 | 10 | 20 | 20 | 50 | 20 | 6.5 |
| Example 2 | PTC-2 | CA2 | 200 | 60 | 5 | 10 | 10 | 20 | 20 | 50 | 20 | 6.5 |
| Example 3 | PTC-3 | CA3 | 200 | 60 | 5 | 10 | 10 | 20 | 20 | 50 | 20 | 6.5 |
| Example 4 | PCT-4 | CA4 | 200 | 60 | 5 | 10 | 10 | 20 | 20 | 50 | 20 | 6.5 |
| Example 5 | PTC-5 | CA5 | 200 | 60 | 5 | 10 | 10 | 20 | 20 | 50 | 20 | 6.5 |
| Example 6 | PTC-6 | CA1 | 200 | 60 | 5 | 10 | 10 | 20 | 20 | 30 | 20 | 6.5 |
| Example 7 | PTC-7 | CA1 | 200 | 60 | 5 | 10 | 10 | 20 | 20 | 60 | 20 | 6.5 |
| Example 8 | PTC-8 | CA1 | 200 | 60 | 5 | 10 | 10 | 20 | 20 | 50 | 16 | 6.5 |
| Example 9 | PTC-9 | CA1 | 200 | 60 | 5 | 10 | 10 | 20 | 20 | 50 | 28 | 6.5 |
| Example 10 | PTC-10 | CA1 | 200 | 60 | 5 | 10 | 10 | 20 | 20 | 50 | 20 | 7 |
| Example 11 | PTC-11 | CA1 | 200 | 60 | 5 | 10 | 10 | 20 | 20 | 50 | 20 | 6 |
| Example 12 | PCT-12 | CA1 | 200 | 60 | 7 | 10 | 10 | 20 | 20 | 50 | 20 | 6.5 |
| Example 13 | PTC-13 | CA1 | 200 | 60 | 9 | 10 | 10 | 20 | 20 | 50 | 20 | 6.5 |
| Example 14 | PTC-14 | CA1 | 200 | 60 | 4 | 10 | 10 | 20 | 20 | 50 | 20 | 6.5 |
| Example 15 | PTC-15 | CA1 | 200 | 60 | 2 | 10 | 10 | 20 | 20 | 50 | 20 | 6.5 |
| Example 16 | PTC-16 | CA1 | 200 | 50 | 5 | 10 | 10 | 20 | 20 | 50 | 20 | 6.5 |
| Example 17 | PTC-17 | CA1 | 200 | 50 | 5 | 10 | 7 | 20 | 20 | 50 | 20 | 6.5 |
| Example 18 | PTC-18 | CA1 | 200 | 60 | 5 | 10 | 10 | 20 | 25 | 50 | 25 | 6.5 |
| Example 19 | PTC-19 | CA1 | 200 | 60 | 5 | 10 | 10 | 20 | 15 | 50 | 20 | 6.5 |
| Example 20 | PTC-20 | CA1 | 200 | 60 | 5 | 10 | 10 | 20 | 15 | 50 | 15 | 6.5 |
| Example 21 | PTC-21 | CA1 | 200 | 60 | 5 | 7 | 10 | 20 | 20 | 50 | 15 | 6.5 |
| Example 22 | PTC-22 | CA1 | 200 | 60 | 5 | 4 | 10 | 20 | 20 | 50 | 15 | 6.5 |
| Example 23 | PTC-23 | CA1 | 200 | 60 | 5 | 10 | | 20 | 20 | 50 | 20 | 6.5 |
| Example 24 | |PTC-24 | CA1 | 200 | 60 | 5 | 10 | | 20 | 20 | 50 | 20 | 6.5 |
| Example 25 | PTC-25 | CA1 | 200 | 60 | 5 | 10 | | 20 | 20 | 50 | 20 | 6.5 |
| Example 26 | PTC-26 | CA1 | 200 | 60 | 5 | 10 | | 20 | 20 | 50 | 20 | 6.5 |
| Example 27 | PTC-27 | CA1 | 200 | 60 | 5 | 10 | | 20 | 20 | 50 | 20 | 6.5 |
| Example 28 | PTC-28 | CA1 | 200 | 60 | 5 | 10 | | 20 | 20 | 50 | 20 | 6.5 |
| Example 29 | PTC-29 | CA1 | 200 | 60 | 5 | 10 | | 20 | 20 | 50 | 20 | 6.5 |
| Example 30 | PTC-30 | CA1 | 200 | 60 | 5 | 10 | | 20 | 20 | 50 | 20 | 6.5 |
| Example 31 | PTC-31 | CA1 | 200 | 60 | 5 | 10 | | 20 | 20 | 50 | 20 | 6.5 |
| Example 32 | PTC-32 | CA1 | 200 | 60 | 5 | 10 | | 20 | 20 | 50 | 20 | 6.5 |
| Example 33 | PTC-33 | CA1 | 200 | 60 | 5 | 10 | | 20 | 20 | 50 | 20 | 6.5 |
| Example 34 | PTC-34 | CA1 | 200 | 60 | 5 | 10 | | 20 | 20 | 50 | 20 | 6.5 |
| Example 35 | PTC-35 | CA1 | 200 | 60 | 5 | 10 | | 20 | 20 | 50 | 20 | 6.5 |
| Example 36 | PTC-36 | CA1 | 200 | 60 | 5 | 10 | | 20 | 20 | 50 | 20 | 6.5 |
| Example 37 | PTC-37 | CA1 | 200 | 60 | 5 | 10 | | 20 | 20 | 50 | 20 | 6.5 |
| Example 38 | PTC-38 | CA1 | 200 | 60 | 5 | 10 | | 20 | 20 | 50 | 20 | 6.5 |
| Example 39 | PTC-39 | CA1 | 200 | 60 | 5 | 10 | | 20 | 20 | 50 | 20 | 6.5 |
| Example 40 | PTC-40 | CA1 | 200 | 60 | 5 | 10 | | 20 | 20 | 50 | 20 | 6.5 |
| Example 41 | PTC-41 | CA1 | 200 | 60 | 5 | 10 | | 20 | 20 | 50 | 20 | 6.5 |
| Example 42 | PTC-42 | CA1 | 200 | 60 | 5 | 10 | | 20 | 20 | 50 | 20 | 6.5 |
| Example 43 | PTC-43 | CA1 | 200 | 60 | 5 | 10 | | 20 | 20 | 50 | 20 | 6.5 |

| | Surface treatment | | | | | | Cellulosic particle characteristics | | | | | |
|---|---|---|---|---|---|---|---|---|---|---|---|---|
| | Cellulosic particles (core particles) Parts by mass | Intermediate layer formation material | | Coating layer formation material | | External additive | | Particle diameter μm | GSDv — | Sphericity — | Surface smoothness % | Mn — | Percentage water absorption % | Percentage weight loss % |
| | | Compound species | Parts by mass | Compound species | Parts by mass | Compound species | Parts by mass | | | | | | | |
| Example 1 | | | | | | | | 7.5 | 1.4 | 0.92 | 90 | 58000 | 12.5 | 20.3 |
| Example 2 | | | | | | | | 7.8 | 1.38 | 0.92 | 90 | 47000 | 12.1 | 20.1 |
| Example 3 | | | | | | | | 7.4 | 1.42 | 0.94 | 92 | 52000 | 11.9 | 20.1 |
| Example 4 | | | | | | | | 7.8 | 1.35 | 0.94 | 91 | 78000 | 11.8 | 19.9 |
| Example 5 | | | | | | | | 6.5 | 1.34 | 0.88 | 88 | 31000 | 12.5 | 20.3 |
| Example 6 | | | | | | | | 7.4 | 1.44 | 0.91 | 91 | 57000 | 12.3 | 20.1 |
| Example 7 | | | | | | | | 7.6 | 1.38 | 0.93 | 92 | 56000 | 12.6 | 10.2 |
| Example 8 | | | | | | | | 8 | 1.44 | 0.91 | 92 | 57000 | 11.2 | 18.2 |
| Example 9 | | | | | | | | 7.2 | 1.43 | 0.94 | 92 | 56000 | 19.5 | 24.3 |

TABLE 1-continued

| | | | | | | | | | | | |
|---|---|---|---|---|---|---|---|---|---|---|---|
| Example 10 | | | | | 7.4 | 1.43 | 0.92 | 88 | 55000 | 11.3 | 17.8 |
| Example 11 | | | | | 7.6 | 1.42 | 0.91 | 87 | 57000 | 19.6 | 25.4 |
| Example 12 | | | | | 3.3 | 1.55 | 0.88 | 85 | 55000 | 15.3 | 22 |
| Example 13 | | | | | 2.8 | 1.61 | 0.89 | 81 | 56000 | 16.8 | 22.8 |
| Example 14 | | | | | 9.5 | 1.21 | 0.93 | 92 | 57000 | 11.9 | 20.2 |
| Example 15 | | | | | 10.2 | 1.22 | 0.92 | 88 | 55000 | 11.7 | 19.7 |
| Example 16 | | | | | 7.2 | 1.68 | 0.96 | 90 | 54000 | 11.9 | 20.1 |
| Example 17 | | | | | 7.8 | 1.73 | 0.87 | 87 | 55000 | 12.1 | 19.9 |
| Example 18 | | | | | 7.3 | 1.31 | 0.99 | 93 | 57000 | 11.8 | 19.8 |
| Example 19 | | | | | 7.2 | 1.29 | 0.75 | 92 | 54000 | 11.5 | 20.1 |
| Example 20 | | | | | 7.3 | 1.35 | 0.68 | 88 | 55000 | 12.1 | 20.1 |
| Example 21 | | | | | 7.2 | 1.56 | 0.81 | 54 | 57000 | 13.6 | 19.9 |
| Example 22 | | | | | 7 | 1.66 | 0.8 | 48 | 55000 | 14.5 | 20.2 |
| Example 23 | 50 | | ST-1 | 5 | 7.8 | 1.45 | 0.91 | 90 | 56000 | 11.3 | 20.1 |
| Example 24 | 50 | | ST-2 | 5 | 7.7 | 1.55 | 0.91 | 91 | 55000 | 11.2 | 18.9 |
| Example 25 | 50 | | ST-3 | 5 | 8 | 1.44 | 0.92 | 90 | 57000 | 11.3 | 19.1 |
| Example 26 | 50 | | ST-4 | 5 | 7.8 | 1.43 | 0.91 | 86 | 55000 | 12.5 | 19.9 |
| Example 27 | 50 | | ST-5 | 5 | 7.7 | 1.45 | 0.89 | 85 | 56000 | 12.8 | 18.9 |
| Example 28 | 50 | | ST-6 | 5 | 7.8 | 1.55 | 0.88 | 87 | 55000 | 12.9 | 18.8 |
| Example 29 | 50 | | ST-7 | 5 | 7.7 | 1.43 | 0.88 | 85 | 54000 | 13.1 | 19 |
| Example 30 | 50 | | ST-8 | 5 | 7.9 | 1.34 | 0.93 | 90 | 57000 | 11.5 | 19.1 |
| Example 31 | 50 | | ST-9 | 5 | 7.7 | 1.38 | 0.93 | 91 | 56000 | 11.2 | 19.2 |
| Example 32 | 50 | | ST-10 | 5 | 7.8 | 1.35 | 0.92 | 91 | 55000 | 11.4 | 19.1 |
| Example 33 | 50 | | ST-11 | 5 | 7.7 | 1.33 | 0.93 | 92 | 57000 | 11.3 | 19.3 |
| Example 34 | 50 | | ST-12 | 5 | 7.6 | 1.42 | 0.88 | 87 | 55000 | 13.1 | 19.2 |
| Example 35 | 50 | | ST-13 | 5 | 7.8 | 1.38 | 0.87 | 88 | 57000 | 13.3 | 19.1 |
| Example 36 | 50 | | ST-14 | 5 | 7.8 | 1.44 | 0.87 | 86 | 55000 | 13.1 | 19 |
| Example 37 | 50 | | ST-15 | 5 | 7.7 | 1.41 | 0.88 | 87 | 56000 | 13.1 | 19.1 |
| Example 38 | 50 | | ST-16 | 5 | 7.6 | 1.35 | 0.91 | 90 | 57000 | 11.2 | 19.2 |
| Example 39 | 50 | | ST-17 | 5 | 7.7 | 1.39 | 0.92 | 91 | 56000 | 11.1 | 19.2 |
| Example 40 | 50 | | ST-18 | 5 | 7.8 | 1.38 | 0.92 | 91 | 55000 | 11.1 | 19.1 |
| Example 41 | 50 | | ST-19 | 5 | 7.7 | 1.35 | 0.87 | 87 | 57000 | 13.9 | 19.2 |
| Example 42 | 50 | | ST-8 | 3 | 7.6 | 1.35 | 0.93 | 92 | 56000 | 11.4 | 19.2 |
| Example 43 | 50 | | ST-8 | 7 | 7.7 | 1.38 | 0.93 | 92 | 55000 | 11.2 | 18.9 |

Cellulosic core particles

| | | Cellulose acylate particle formation | | | | | | Saponification of cellulose acylate particles | | | |
|---|---|---|---|---|---|---|---|---|---|---|---|
| | | Cellulose acylate | | Calcium | | Sodium | | Diluted hydrochloric | 20% aqueous solution of sodium | | |
| | Particle number | Compound species | Parts by mass | carbonate Parts by mass | Carboxy-methylcellulose Parts by mass | hydroxide Parts by mass | Stirring time hr | acid Parts by mass | hydroxide Parts by mass | Reaction temperature ° C | Stirring time hours | pH |
| Example 44 | PTC-44 | CA1 | 200 | 60 | 5 | 10 | 20 | 20 | 50 | 20 | 6.5 |
| Example 45 | PTC-45 | CA1 | 200 | 60 | 5 | 10 | 20 | 20 | 50 | 20 | 6.5 |
| Example 46 | PTC-46 | CA1 | 200 | 60 | 5 | 10 | 20 | 20 | 50 | 20 | 6.5 |
| Example 47 | PTC-47 | CA1 | 200 | 60 | 5 | 10 | 20 | 20 | 50 | 20 | 6.5 |
| Example 48 | PTC-48 | CA1 | 200 | 60 | 5 | 10 | 20 | 20 | 50 | 20 | 6.5 |
| Example 49 | PTC-49 | CA1 | 200 | 60 | 5 | 10 | 20 | 20 | 50 | 20 | 6.5 |
| Example 50 | PTC-50 | CA1 | 200 | 60 | 5 | 10 | 20 | 20 | 50 | 20 | 6.5 |
| Example 51 | PTC-51 | CA1 | 200 | 60 | 5 | 10 | 20 | 20 | 50 | 20 | 6.5 |
| Example 52 | PTC-52 | CA1 | 200 | 60 | 5 | 10 | 20 | 20 | 50 | 20 | 6.5 |
| Example 53 | PTC-53 | CA1 | 200 | 60 | 5 | 10 | 20 | 20 | 50 | 20 | 6.5 |
| Example 54 | PTC-54 | CA1 | 200 | 60 | 5 | 10 | 20 | 20 | 50 | 20 | 6.5 |
| Example 55 | PTC-55 | CA1 | 200 | 60 | 5 | 10 | 20 | 20 | 50 | 20 | 6.5 |
| Example 56 | PTC-56 | CA1 | 200 | 60 | 5 | 10 | 20 | 20 | 50 | 20 | 6.5 |
| Example 57 | PTC-57 | CA1 | 200 | 60 | 5 | 10 | 20 | 20 | 50 | 20 | 6.5 |
| Example 58 | PTC-58 | CA1 | 200 | 60 | 5 | 10 | 20 | 20 | 50 | 20 | 6.5 |
| Example 59 | PTC-59 | CA1 | 200 | 60 | 5 | 10 | 20 | 20 | 50 | 20 | 6.5 |
| Example 60 | PTC-60 | CA1 | 200 | 60 | 5 | 10 | 20 | 20 | 50 | 20 | 6.5 |
| Example 61 | PTC-61 | CA1 | 200 | 60 | 5 | 10 | 20 | 20 | 50 | 20 | 6.5 |
| Example 62 | PTC-62 | CA1 | 200 | 60 | 5 | 10 | 20 | 20 | 50 | 20 | 6.5 |
| Example 63 | PTC-63 | CA1 | 200 | 60 | 5 | 10 | 20 | 20 | 50 | 20 | 6.5 |
| Example 64 | PTC-64 | CA1 | 200 | 60 | 5 | 10 | 20 | 20 | 50 | 20 | 6.5 |
| Comparative Example 1 | PTC-65 | CA1 | 200 | 60 | 5 | 10 | 10 | 20 | 50 | 15 | 7.5 |
| Comparative Example 2 | PTC-66 | CA1 | 200 | 60 | 5 | 10 | 20 | 20 | 50 | 40 | 6 |
| Comparative Example 3 | PTC-67 | CA1 | 200 | 60 | 5 | 10 | 10 | 20 | 50 | 15 | 7.5 |

TABLE 1-continued

| | | | | | | | | | | |
|---|---|---|---|---|---|---|---|---|---|---|
| Comparative Example 4 | PTC-68 | CA1 | 200 | 60 | 5 | 10 | 20 | 20 | 50 | 40 | 6 |
| Comparative Example 5 | PTC-69 | CA1 | 200 | 60 | 5 | 10 | 10 | 20 | 50 | 15 | 7.5 |
| Comparative Example 6 | PTC-70 | CA1 | 200 | 60 | 5 | 10 | 20 | 20 | 50 | 40 | 6 |
| Comparative Example 7 | PTC-71 | CA1 | 200 | 60 | 5 | 10 | 10 | 20 | 50 | 15 | 7.5 |
| Comparative Example 8 | PTC-72 | CA1 | 200 | 60 | 5 | 10 | 20 | 20 | 50 | 40 | 6 |

| | Surface treatment | | | | | | Cellulosic particle characteristics | | | | | | |
|---|---|---|---|---|---|---|---|---|---|---|---|---|---|
| | Cellulosic particles (core particles) | Intermediate layer formation material | | Coating layer formation material | | External additive | | Particle | | | Surface | Percentage | Percentage |
| | Parts by mass | Compound species | Parts by mass | Compound species | Parts by mass | Compound species | Parts by mass | diameter μm | GSDv | Sphericity | smoothness % | Mn | water absorption % | weight loss % |
| Example 44 | 50 | AA-1 | 0.5 | ST-8 | 5 | | | 7.8 | 1.41 | 0.94 | 93 | 54000 | 11.6 | 20.5 |
| Example 45 | | 50|AA-2 | 0.5 | ST-8 | 5 | | | 7.6 | 1.4 | 0.95 | 94 | 55000 | 11.5 | 19.2 |
| Example 46 | 50 | AA-3 | 0.5 | ST-8 | 5 | | | 7.5 | 1.38 | 0.94 | 93 | 54000 | 11.5 | 19.3 |
| Example 47 | 50 | AA-4 | 0.5 | ST-8 | 5 | | | 7.7 | 1.39 | 0.96 | 92 | 57000 | 11.4 | 19.2 |
| Example 48 | | AA-5 | 0.5 | ST-8 | 5 | | | 7.8 | 1.42 | 0.95 | 91 | 54000 | 11.3 | 19.4 |
| Example 49 | 50 | AA-6 | 0.5 | ST-8 | 5 | | | 7.7 | 1.42 | 0.94 | 90 | 57000 | 11.3 | 19.3 |
| Example 50 | 50 | AA-7 | 0.5 | ST-8 | 5 | | | 7.8 | 1.38 | 0.95 | 90 | 55000 | 11.2 | 19.5 |
| Example 51 | 50 | AA-8 | 0.5 | ST-8 | 5 | | | 7.7 | 1.55 | 0.89 | 86 | 57000 | 13.8 | 19.2 |
| Example 52 | 50 | AA-9 | 0.5 | ST-8 | 5 | | | 7.6 | 1.58 | 0.88 | 87 | 53000 | 13.6 | 19.3 |
| Example 53 | 50 | AA-10 | 0.5 | ST-8 | 5 | | | 7.7 | 1.62 | 0.87 | 86 | 57000 | 13.8 | 19.2 |
| Example 54 | 50 | AA-11 | 0.5 | ST-8 | 5 | | | 7.8 | 1.58 | 0.9 | 90 | 55000 | 13.3 | 19.3 |
| Example 55 | | AA-12 | 0.5 | ST-8 | 5 | | | 7.9 | 1.34 | 0.91 | 91 | 54000 | 13.3 | 19 |
| Example 56 | 50 | AA-13 | 0.5 | ST-8 | 5 | | | 7.9 | 1.38 | 0.91 | 90 | 57000 | 13.2 | 19.1 |
| Example 57 | 50 | AA-1 | 0.25 | ST-8 | 5 | | | 7.5 | 1.44 | 0.95 | 90 | 54000 | 11.4 | 19.2 |
| Example 58 | 50 | AA-1 | 1.5 | ST-8 | 5 | | | 7.4 | 1.38 | 0.94 | 91 | 57000 | 11.6 | 19.2 |
| Example 59 | 50 | AA-1 | 0.5 | ST-8 | 3 | | | 7.5 | 1.33 | 0.93 | 92 | 55000 | 11.2 | 19.3 |
| Example 60 | 50 | AA-1 | 0.5 | ST-8 | 7 | | | 7.7 | 1.32 | 0.94 | 93 | 56000 | 11.3 | 19.1 |
| Example 61 | | AA-1 | 0.5 | ST-8 | 5 | EA-1 | 0.5 | 8 | 1.35 | 0.91 | 90 | 55000 | 11.8 | 18.5 |
| Example 62 | 50 | AA-1 | 0.5 | ST-8 | 5 | EA-2 | 0.5 | 8 | 1.37 | 0.91 | 90 | 56000 | 11.2 | 18.5 |
| Example 63 | | AA-1 | 0.5 | ST-8 | 5 | EA-1 | 5 | 8.1 | 1.34 | 0.92 | 90 | 55000 | 11 | 18.3 |
| Example 64 | 50 | | | ST-8 | 5 | EA-1 | 0.5 | 8 | 1.34 | 0.9 | 88 | 54000 | 11.5 | 18.6 |
| Comparative Example 1 | | | | | | | | 6.9 | 1.44 | 0.91 | 90 | 51000 | 10.6 | 17.3 |
| Comparative Example 2 | | | | | | | | 7.2 | 1.43 | 0.92 | 90 | 49000 | 20.4 | 26.1 |
| Comparative Example 3 | 50 | | | ST-8 | 5 | | | 6.8 | 1.45 | 0.88 | 88 | 51000 | 10.1 | 17 |
| Comparative Example 4 | 50 | | | ST-8 | 5 | | | 6.7 | 1.38 | 0.89 | 87 | 50000 | 21.1 | 16.1 |
| Comparative Example 5 | 50 | AA-1 | 0.5| | ST-8 | 5 | | | 7 | 1.48 | 0.9 | 89 | 51000 | 10 | 16.5 |
| Comparative Example 6 | 50 | AA-1 | 0.5 | ST-8 | 5 | | | 6.9 | 1.45 | 0.9 | 89 | 50000 | 20.4 | 17 |
| Comparative Example 7 | 50 | AA-1 | 0.5 | ST-8 | 5 | EA-1 | 0.5 | 6.9 | 1.44 | 0.86 | 86 | 49000 | 9.9 | 16.2 |
| Comparative Example 8 | 50 | AA-1 | | ST-8 | 5 | EA-1 | 0.5 | 7 | 1.47 | 0.87 | 86 | 49000 | 21.3 | 26.1 |

TABLE 2

| | Product name | Manufacturer | Core particles | Intermediate layer | Coating layer | External additive | Particle diameter μm |
|---|---|---|---|---|---|---|---|
| Comparative Example 9 | PTC-101 CELLULOBEADS D10 | Daito Kasei | Cellulose | None | None | None | 14 |
| Comparative Example 10 | PTC-102 CELLUFLOW C25 | JNC | Cellulose | None | None | None | 10 |

TABLE 2-continued

| | | | | Core particles | Intermediate layer | Coating layer | External additive | Particle diameter μm |
|---|---|---|---|---|---|---|---|---|
| Comparative Example 11 | PTC-103 | CELLUFLOW T25 | JNC | Cellulose | None | None | None | 12 |
| Comparative Example 12 | PTC-104 | OTS-0.5A CELLULOBEADS D-10 (Example 1 in Japanese Unexamined Patent Application Publication No. 2020-132616) | Daito Kasei | Cellulose | None | Triethoxy-octylsilane | None | 14 |
| Comparative Example 13 | PTC-105 | S-STM CELLULOBEADS D-5 (Example 2 in Japanese Unexamined Patent Application Publication No. 2020-132616) | Daito Kasei | Cellulose | None | Magnesium stearate | None | 10 |

| | GSDv — | Sphericity — | Surface smoothness % | Mn — | Percentage water absorption % | Percentage weight loss % |
|---|---|---|---|---|---|---|
| Comparative Example 9 | 1.17 | 0.97 | 94 | 110000 | 9.8 | 15.5 |
| Comparative Example 10 | 1.86 | 0.97 | 88 | 45000 | 9.7 | 15.6 |
| Comparative Example 11 | 1.94 | 0.98 | 88 | 48000 | 10.4 | 10.3 |
| Comparative Example 12 | 1.32 | 0.98 | 85 | 110000 | 8.9 | 10.1 |
| Comparative Example 13 | 1.86 | 0.97 | 56 | 110000 | 9.1 | 10.5 |

| | | Related art | Core particles | Intermediate layer | Coating layer | External additive | Particle diameter μm |
|---|---|---|---|---|---|---|---|
| Comparative Example 14 | PTC-111 | Example 1 in Japanese Patent No. 6921293 | Cellulose | None | Zinc stearate | None | 9 |
| Comparative Example 15 | PTC-112 | Example 2 in Japanese Patent No. 6921293 | Cellulose | None | Magnesium stearate | None | 9 |

| | GSDv — | Sphericity — | Surface smoothness % | Mn — | Percentage water absorption % | Percentage weight loss % |
|---|---|---|---|---|---|---|
| Comparative Example 14 | 1.45 | 0.96 | 92 | 33000 | 9.5 | 15.2 |
| Comparative Example 15 | 1.55 | 0.96 | 92 | 32000 | 9.8 | 15.8 |

Characteristics Evaluation
Particle Characteristics

For the cellulosic particles obtained in the Examples and Comparative Examples, the following particle characteristics are measured according to the methods described above.

Volume-average particle diameter ("Particle diameter" in the tables)

Upper geometric standard deviation by number ("GSDv" in the tables)

Sphericity

Surface smoothness

Number-average molecular weight of cellulose ("Mn" in the tables)

Percentage water absorption measured by method B in ISO 15512:1999

Percentage weight loss after standing in a 28° C. and 85% RH environment for 3 days and subsequent vacuum-drying at 100° C. for 1 hour Percentage Biodegradability The 60-day percentage biodegradability in activated sludge of the cellulosic particles obtained in the Examples and Comparative Examples is measured by a method according to OECD 306F.

Cosmetics Evaluation

Production of Cosmetics

Of the cellulosic particles of the Examples and Comparative Examples, the cellulosic particles indicated in Table 4 are used to produce a variety of cosmetics. Specifically, the following is performed.

Liquid Foundation

According to the formula presented in Table 3-1, liquid foundation is obtained by a known method.

TABLE 3-1

Liquid Foundation

| Formula | Compound | Product name (manufacturer) | Parts by mass |
|---|---|---|---|
| Particles | Particles | The cellulosic particles specified in Table 4 | 10 |
| Ingredients other than the particles | Propylene glycol | Propylene Glycol JSQI (Dow Toray) | 5 |
| | Bentonite | OVWIL BR (Mizusawa Industrial Chemicals) | 1 |
| | Triethanolamine | Triethanolamine 99% (Dow Toray) | 1 |
| | Stearic acid | NAA172 (NOF) | 3 |
| | Stearyl alcohol | NAA45 (NOF) | 1 |
| | Liquid paraffin | MORESCO-VIOLESS (MORESCO) | 8 |
| | Isopropyl myristate | IPM-R (NOF) | 5 |
| | Petrolatum | NOMCORT W (Nisshin OilliO) | 2 |
| | Stearic acid monoglyceride | EXCEL 84 (Kao Chemicals) | 2 |
| | POE (20) stearyl ether | EMALEX 602 (Nihon Emulsion) | 1 |
| | Titanium oxide | MKR-1 (Sakai Chemical) | 8 |
| | Kaolin | BERACLAY 20061 AMAZONIAN WHITE CLAY (BERECA) | 5 |
| | Iron oxide | C33-128 Sun CROMA RED Iron Oxide (Sun Chemical) | 0.5 |
| | Preservative | OPTIPHEN HD (Ashland Japan) | 0.5 |
| | Fragrance | Bisabolol rac. (BASF Japan) | 0.3 |
| | Purified water | | 46.5 |
| Total | | | 100 |

Milky Lotion

According to the formula presented in Table 3-2, a milky lotion is obtained by a known method.

TABLE 3-2

Milky Lotion

| Formula | Compound | Product name (manufacturer) | Parts by mass |
|---|---|---|---|
| Particles | Particles | As in the Example or Comparative Example | 2 |
| Ingredients other than the particles | Propylene glycol | Propylene Glycol JSQI (Dow Toray) | 5 |
| | Polyethylene glycol 1500 | PEG#1500 (NOF) | 3 |
| | Carboxy vinyl polymer | NTC-CARBOMER 380 (Nikko Chemicals) | 0.1 |
| | Triethanolamine | Triethanolamine 99% (Dow Toray) | 1 |
| | Stearic acid | NAA172 (NOF) | 2 |
| | Cetyl alcohol | NAA44 (NOF) | 1.5 |
| | Liquid paraffin | MORESCO-VIOLESS (MORESCO) | 10 |
| | Petrolatum | NOMCORT W (Nisshin OilliO) | 3 |
| | Glyceryl oleate | NIKKOL MGO (Nikko Chemicals) | 1 |
| | POE (20) sorbitan oleate | NIKKOL T0-0V (Nikko Chemicals) | 1 |

TABLE 3-2-continued

Milky Lotion

| Formula | Compound | Product name (manufacturer) | Parts by mass |
|---|---|---|---|
| | Preservative | OPTIPHEN HD (Ashland Japan) | 0.2 |
| | Fragrance | Bisabolol rac. (BASF Japan) | 0.1 |
| | Purified water | | 70.1 |
| | Total | | 100 |

Loose Powder

The ingredients listed in Table 3-3 are mixed together in a blender, the resulting mixture is milled in a mill, and then the resulting particles are sieved through a 250-μm mesh sieve to give a loose powder.

TABLE 3-3

Loose Powder

| Formula | Compound | Product name (manufacturer) | Parts by mass |
|---|---|---|---|
| Particles | Particles | The cellulosic particles specified in Table 4 | 10 |
| Ingredients other than the particles | Talc | Talc CT-25 (Yamaguchi Mica) | 65 |
| | Kaolin | BERACLAY 20061 AMAZONIAN WHITE CLAY (BERECA) | 5 |
| | Titanium oxide | MKR-1 (Sakai Chemical) | 3 |
| | Zinc myristate | POWDER BASE M (NOF) | 5 |
| | Magnesium carbonate | Natrasorb HFB (Nouryon Japan) | 5 |
| | Sericite | Sericite FSE (Sanshin Mining Ind.) | 7 |
| | Total | | 100 |

Powder Foundation

According to the formula presented in Table 3-4, the particles and powders are mixed together, the binders are mixed together separately, the mixture of particles and powders is gradually added into the binders with stirring, and then the mixture is mixed to give powder foundation.

TABLE 3-4

Powder Foundation

| Formula | Compound | Product name (manufacturer) | Parts by mass |
|---|---|---|---|
| Particles | Particles | The cellulosic particles specified in Table 4 | 8 |
| Powders other than the particles | Talc | Talc CT-25 (Yamaguchi Mica) | 52.5 |
| | Mica | Mica FA450 (Yamaguchi Mica) | 16 |
| | Titanium oxide | MKR-1 (Sakai Chemical) | 12 |
| | Black iron oxide | C33-134 Sun CROMA Black Iron Oxide (Sun Chemical) | 0.2 |
| | Red iron oxide | C33-128 Sun CROMA Red Iron Oxide (Sun Chemical) | 0.4 |
| | Yellow iron oxide | C33-210 Sun CROMA Yellow Iron Oxide (Sun Chemical) | 2.4 |
| Binders | Diisostearyl malate | Neosolue-DiSM (Nippon Fine Chemical) | 3 |
| | Caprylic/capric triglyceride | Caprylic/Capric Triglyceride (FUJIFILM Wako Pure Chemical) | 2 |
| | Neopentyl glycol dicaprate | NPDC (Kokyu Alcohol Kogyo) | 2 |
| | Pentylene glycol | DIOL PD (Kokyu Alcohol Kogyo) | 1.5 |
| | Total | | 100 |

Sunscreen Cream

According to the formula presented in Table 3-5, oil phase (1) is warmed to 50° C. until dissolution, then oil phase (2) is added, and the two phases are mixed together. Water phase (2) is brought into dissolution and mixed with water phase (1). After the particles and the powders are added to the mixture of oil phases (1) and (2) and dispersed and mixed, emulsification is performed by gradually adding the mixture of water phases (1) and (2), giving a sunscreen cream.

TABLE 3-5

Sunscreen Cream

| Formula | Compound | Product name (manufacturer) | Parts by mass |
|---|---|---|---|
| Particles | Particles | The cellulosic particles specified in Table 4 | 5 |
| Powders other than the particles | Quaternium-18 hectorite | SUMECTON-SAN (Kunimine Industries) | 1 |
|  | Titanium oxide | MKR-1 (Sakai Chemical) | 8 |
| Oil phase (1) | Ethylhexyl methoxycinnamate | Uvinul MC80 (BASF Japan) | 4 |
|  | t-Butyl methoxydibenzoylmethane | Eusolex 9030 (Merck KGaA) | 0.5 |
|  | Bis-ethylhexyloxyphenol methoxyphenyl triazine | Tinosorb S (BASF Japan) | 2 |
|  | Isopropyl sebacate | Isopropyl Sebacate (FUJIFILM Wako Pure Chemical) | 6 |
|  | Caprylic/capric triglyceride | Caprylic/Capric Triglyceride (FUJIFILM Wako Pure Chemical) | 2 |
| Oil phase (2) | Cetyl PEG/PPG-10/1 dimethicone | KF-6048 (Shin-Etsu Chemical) | 4 |
|  | Sorbitan isostearate | EMALEX SPIS 100 (Nihon Emulsion) | 0.4 |
|  | Cyclopentasiloxane | KF-995 (Shin-Etsu Chemical) | 16 |
|  | Ethylhexylglycerin, glyceryl caprylate | NIKKOL NIKKOGUARD 88 (Nikko Chemicals) | 0.4 |
| Water phase (1) | PEG-240/HDI copolymer bis-decyltetradeceth-20 ether | ADEKA NOL GT 700 | 1 |
|  | Glycerin | RG-CO-P (NOF) | 4 |
|  | 1,3-Butylene glycol | HAISUGARCANE BG (Kokyu Alcohol Kogyo) | 4 |
|  | Pentylene glycol | DIOL PD (Kokyu Alcohol Kogyo) | 1 |
|  | Phenoxyethanol | Phenoxetol (Clariant Japan) | 0.3 |
| Water phase (2) | Magnesium sulfate | Magnesium Sulfate (FUJIFILM Wako Pure Chemical) | 0.3 |
|  | Purified water |  | 40.1 |
|  | Total |  | 100 |

All-in-One Gel

According to the formula presented in Table 3-6, water phases (1) and (2) are mixed together. Then oil phase (1) is mixed and added to the mixture of water phases (1) and (2). After oil phase (2) is warmed to 70° C., the particles are added to give a dispersion. The resulting dispersion is added to the mixture of water phases (1) and (2) and oil phase (1), and emulsification is performed by stirring and mixing the resulting mixture. After the neutralizing agent is added, the emulsion is stirred and cooled to give an all-in-one gel.

TABLE 3-6

All-in-One Gel

| Formula | Compound | Product name (manufacturer) | Parts by mass |
|---|---|---|---|
| Particles | Particles | The cellulosic particles specified in Table 4 | 4 |
| Oil phase (1) | Xanthan gum | NOMCORT Z (The Nisshin OilliO Group) | 0.1 |
|  | Hydrogenated lecithin | COATSOME NC-21 (NOF) | 0.1 |
|  | Glycerin | RG-CO-P (NOF) | 5 |
|  | Isopentyldiol | Isoprene Glycol (Kuraray) | 4 |
| Oil phase (2) | Polyglyceryl-10 isostearate | Sunsoft Q-18S-C (Taiyo Kagaku) | 1.2 |
|  | Polyglyceryl-4 isostearate | NIKKOL Tetraglyn 1-SV (Nikko Chemicals) | 0.3 |
|  | Behenyl alcohol | NAA-422 (NOF) | 1.8 |
|  | Octyldodecanol | RISONOL 20SP (Kokyu Alcohol Kogyo) | 0.8 |

TABLE 3-6-continued

All-in-One Gel

| Formula | Compound | Product name (manufacturer) | Parts by mass |
|---|---|---|---|
| | Cetyl ethylhexanoate | FineNeo-CIO (Nippon Fine Chemical) | 3.2 |
| | Squalane | NIKKOL Olive Squalane (Nikko Chemicals) | 0.6 |
| | Tocopherol | Tocopherol 100 (The Nisshin OilliO Group) | 0.6 |
| | Ethylhexylglycerin, glyceryl caprylate | NIKKOL NIKKOGUARD 88 (Nikko Chemicals) | 0.6 |
| Water phase (1) | Carboxy vinyl polymer | NTC-CARBOMER 380 (Nikko Chemicals) | 0.4 |
| | Pentylene glycol | DIOL PD (Kokyu Alcohol Kogyo) | 1 |
| | Phenoxyethanol | Phenoxetol (Clariant Japan) | 0.3 |
| | Sodium dilauramidoglutamide lysine, water | Pellicer LB 100 (Asahi Kasei Finechem) | 0.1 |
| Water phase (2) | Citric acid | Citric Acid (FUJIFILM Wako Pure Chemical) | 0.1 |
| | Purified water | | 1.4 |
| | Neutralizing agent A 10% aqueous solution of sodium hydroxide | | |
| | Total | | 100 |

Foundation Primer

According to the formula presented in Table 3-7, the particles are dispersed in component A. and the resulting mixture is stirred. Component B is added, and the resulting mixture is stirred to give a foundation primer.

TABLE 3-7

Foundation Primer

| Formula | Compound | Product name (manufacturer) | Parts by mass |
|---|---|---|---|
| Particles | Particles | The cellulosic particles specified in Table 4 | 10 |
| Component A | (Dimethicone/(PEG-10/15)) crosspolymer, dimethicone | KSG-210 (Shin-Etsu Chemical) | 3.5 |
| | PEG-9 polydimethylsiloxyethyl dimethicone | KF-6028 (Shin-Etsu Chemical) | 2 |
| | Dimethicone | KF-7312K (Shin-Etsu Chemical) | 5 |
| | Isononyl isononanoate | KAK99 (Kokyu Alcohol Kogyo) | 4.5 |
| | Ethylhexyl methoxycinnamate | NOMCORT TAB (The Nisshin OilliO Group) | 10 |
| | Quaternium-18 hectorite | SUMECTON-SAN (Kunimine Industries) | 1.2 |
| | (Dimethicone/vinyl dimethicone) crosspolymer, dimethicone | KSG-16 (Shin-Etsu Chemical) | 5 |
| | Cyclomethicone | DOWSIL SH245 Fluid (Dow Toray) | 25 |
| Component B | 1,3-Butylene glycol | HAISUGARCANE BG (Kokyu Alcohol Kogyo) | 5 |
| | Sodium citrate | Trisodium Citrate (Jungbunzlauer International AG) | 2 |
| | Preservative | OPTIPHEN HD (Ashland Japan) | 0.3 |
| | Purified water | | 26.5 |
| | Total | | 100 |

Lip Primer

According to the formula presented in Table 3-8, component B is heated to 60° C. and mixed. The particles are dispersed in the mixture, component A is added, heating in a microwave is performed until dissolution, the resulting solution is mixed, and then the resulting mixture is poured into a mold and cooled. The resulting solid is set into a lipstick case to give a lip primer.

TABLE 3-8

Lip Primer

| Formula | Compound | Product name (manufacturer) | Parts by mass |
|---|---|---|---|
| Particles | Particles | The cellulosic particles specified in Table 4 | 10 |
| Component A | Ceresin | CERESIN #810 (Nikko Rika) | 4.27 |
| | Microcrystalline wax | Refined Microcrystalline Wax (Nikko Rika) | 1.55 |
| | Candelilla wax | Refined Candelilla Wax No. 1 (Nippon Wax) | 5.03 |
| | Paraffin | Refined Paraffin Wax (Nikko Rika) | 3.07 |
| Component B | Diisostearyl malate | Neosolue-DiSM (Nippon Fine Chemical) | 17.95 |
| | Dipentaerythrite fatty acid ester | COSMOL 168 EV (The Nisshin OilliO Group) | 6.22 |
| | Adsorption refined lanolin | SUPER STEROL LIQUID (Croda Japan) | 2.52 |
| | Liquid lanolin acetate | ACELAN SP (Croda Japan) | 13.34 |
| | Ethylhexylglyceryl | GLYMOIST (NOF) | 19.02 |
| | Liquid paraffin | HYDROBRITE 380 PO (Sonneborn) | 7.28 |
| | Isotridecyl isononanoate | KAK139 (Kokyu Alcohol Kogyo) | 3.21 |
| | Polyglyceryl-2 triisostearate | EMALEX TISG-2 (Nihon Emulsion) | 4.01 |
| | Methylphenyl polysiloxane | BELSIL PDM 20 (Wacker Asahikasei Silicone) | 2.41 |
| | Methylparaben | Nipagin M (Clariant Japan) | 0.07 |
| | Tocopherol | Tocopherol 100 (The Nisshin OilliO Group) | 0.05 |
| | Total | | 100 |

Body Powder

A body powder is obtained by mixing together the ingredients listed in Table 3-9 using a laboratory mixer.

TABLE 3-9

Body Powder

| Formula | Compound | Product name (manufacturer) | Parts by mass |
|---|---|---|---|
| Particles | Particles | The cellulosic particles specified in Table 4 | 10 |
| Ingredients other than the particles | Talc | Talc CT-25 (Yamaguchi Mica) | 89.7 |
| | Fragrance | Bisabolol rac. (BASF Japan) | 0.3 |

Solid Powder Eyeshadow

According to the formula presented in Table 3-10, the particles and powders are mixed together, the binder is uniformly dissolved, the resulting solution is added to the powder mixture, the resulting mixture is further mixed, and then the resulting mixture is compression-molded to give a solid powder eyeshadow.

TABLE 3-10

Solid Powder Eyeshadow

| Formula | Compound | Product name (manufacturer) | Parts by mass |
|---|---|---|---|
| Particles | Particles | The cellulosic particles specified in Table 4 | 51 |
| Powders other than the particles | Mica | Talc CT-25 (Yamaguchi Mica) | 15 |
| | Sericite | Sericite FSE (Sanshin Mining Ind.) | 5 |
| | Pigment | Unipure Blue LC 621 (Sensient Technologies Japan) | 15 |
| | Pearl pigment | TWINCLEPEARL (Nihon Koken Kogyo | 10 |
| Binder | Methyl polysiloxane | BELSIL DM 10 (Wacker Asahikasei Silicone) | 2 |
| Others | Sorbitan sesquioleate | EMALEX SPO-150 (Nihon Emulsion) | 2 |
| | Total | | 100 |

Evaluations

The spreading and hardness of the resulting cosmetics are evaluated as follows.

Spreading

For each type of cellulosic particles and cosmetic, ten female testers are asked to put a 5-g sample on the back of their hand, spread the sample, and rate it with the best being 10 and the worst being 0. This operation is evaluated for an untreated sample (spreading (1)), an acid-treated sample (spreading (2)), which is a sample stirred for 8 hours in an aqueous solution of hydrochloric acid with a pH of 4 and then lyophilized, and an alkali-treated sample (spreading (3)), which is a sample stirred for 8 hours in an aqueous solution of sodium hydroxide with a pH of 10 and then lyophilized.

(Spreading (2)) and (spreading (3)) correspond to the evaluations of acid resistance and alkali resistance, respectively, of the cellulosic particles.

Hardness

For each type of cellulosic particles and cosmetic, ten female testers are asked to put a 5-g sample on the back of their hand, spread the sample, and rate it with the softest being 10 and the hardest being 0. This operation is evaluated for an untreated sample (hardness (1)), an acid-treated sample (hardness (2)), which is a sample stirred for 8 hours in an aqueous solution of hydrochloric acid with a pH of 4 and then lyophilized, and an alkali-treated sample (hardness (3)), which is a sample stirred for 8 hours in an aqueous solution of sodium hydroxide with a pH of 10 and then lyophilized.

(Hardness (2)) and (hardness (3)) correspond to the evaluations of acid resistance and alkali resistance, respectively, of the cellulosic particles.

TABLE 4-1

| | | Particles | | | | | | | Liquid foundation | | | | | | Milky lotion | | | | | |
|---|---|---|---|---|---|---|---|---|---|---|---|---|---|---|---|---|---|---|---|---|
| | | Percentage | | | | | | | | | | | | | | | | | | |
| | Particle | biodegradability | Spreading | | | Hardness | | | Spreading | | | Hardness | | | Spreading | | | Hardness | | |
| | number | % | (1) | (2) | (3) | (1) | (2) | (3) | (1) | (2) | (3) | (1) | (2) | (3) | (1) | (2) | (3) | (1) | (2) | (3) |
| Example 1 | PTC-1 | 97 | 8 | 7 | 7 | 8 | 7 | 7 | 8 | 6 | 6 | 8 | 6 | 6 | 8 | 6 | 6 | 8 | 6 | 6 |
| Example 2 | PTC-2 | 97 | 8 | 7 | 7 | 8 | 7 | 7 | 8 | 6 | 6 | 8 | 6 | 6 | 8 | 6 | 6 | 8 | 6 | 6 |
| Example 3 | PTC-3 | 98 | 8 | 7 | 7 | 8 | 7 | 7 | 8 | 6 | 6 | 8 | 6 | 6 | 8 | 6 | 6 | 8 | 6 | 6 |
| Example 4 | PCT-4 | 97 | 8 | 7 | 7 | 8 | 7 | 7 | 8 | 6 | 6 | 8 | 6 | 6 | 8 | 6 | 6 | 8 | 6 | 6 |
| Example 5 | PTC-5 | 96 | 7 | 6 | 6 | 7 | 6 | 6 | 7 | 5 | 5 | 7 | 5 | 5 | 7 | 5 | 5 | 7 | 5 | 5 |
| Example 6 | PTC-6 | 97 | 8 | 7 | 7 | 8 | 7 | 7 | 8 | 6 | 6 | 8 | 6 | 6 | 8 | 6 | 6 | 8 | 6 | 6 |
| Example 7 | PTC-7 | 97 | 8 | 7 | 7 | 8 | 7 | 7 | 8 | 6 | 6 | 8 | 6 | 6 | 8 | 6 | 6 | 8 | 6 | 6 |
| Example 8 | PTC-8 | 98 | 8 | 7 | 7 | 8 | 7 | 7 | 8 | 6 | 6 | 8 | 6 | 6 | 8 | 6 | 6 | 8 | 6 | 6 |
| Example 9 | PTC-9 | 97 | 8 | 7 | 7 | 8 | 7 | 7 | 8 | 6 | 6 | 8 | 6 | 6 | 8 | 6 | 6 | 8 | 6 | 6 |
| Example 10 | PTC-10 | 93 | 7 | 6 | 6 | 7 | 6 | 6 | 7 | 5 | 5 | 7 | 5 | 5 | 7 | 5 | 5 | 7 | 5 | 5 |
| Example 11 | PTC-11 | 94 | 7 | 6 | 6 | 7 | 6 | 6 | 7 | 5 | 5 | 7 | 5 | 5 | 7 | 5 | 5 | 7 | 5 | 5 |
| Example 12 | PCT-12 | 97 | 8 | 7 | 7 | 8 | 7 | 7 | 8 | 6 | 6 | 8 | 6 | 6 | 8 | 6 | 6 | 8 | 6 | 6 |
| Example 13 | PTC-13 | 94 | 7 | 6 | 6 | 7 | 6 | 6 | 7 | 5 | 5 | 7 | 5 | 5 | 7 | 5 | 5 | 7 | 5 | 5 |
| Example 14 | PTC-14 | 97 | 8 | 7 | 7 | 8 | 7 | 7 | 8 | 6 | 6 | 8 | 6 | 6 | 8 | 6 | 6 | 8 | 6 | 6 |
| Example 15 | PTC-15 | 93 | 7 | 6 | 6 | 7 | 6 | 6 | 7 | 5 | 5 | 7 | 5 | 5 | 7 | 5 | 5 | 7 | 5 | 5 |
| Example 16 | PTC-16 | 97 | 8 | 7 | 7 | 8 | 7 | 7 | 8 | 6 | 6 | 8 | 6 | 6 | 8 | 6 | 6 | 8 | 6 | 6 |
| Example 17 | PTC-17 | 93 | 7 | 6 | 6 | 7 | 6 | 6 | 7 | 5 | 5 | 7 | 5 | 5 | 7 | 5 | 5 | 7 | 5 | 5 |
| Example 18 | PTC-18 | 97 | 8 | 7 | 7 | 8 | 7 | 7 | 8 | 6 | 6 | 8 | 6 | 6 | 8 | 6 | 6 | 8 | 6 | 6 |
| Example 19 | PTC-19 | 96 | 8 | 7 | 7 | 8 | 7 | 7 | 8 | 6 | 6 | 8 | 6 | 6 | 8 | 6 | 6 | 8 | 6 | 6 |
| Example 20 | PTC-20 | 92 | 7 | 6 | 6 | 7 | 6 | 6 | 7 | 5 | 5 | 7 | 5 | 5 | 7 | 5 | 5 | 7 | 5 | 5 |
| Example 21 | PTC-21 | 97 | 8 | 7 | 7 | 8 | 7 | 7 | 8 | 6 | 6 | 8 | 6 | 6 | 8 | 6 | 6 | 8 | 6 | 6 |
| Example 22 | PTC-22 | 93 | 7 | 6 | 6 | 7 | 6 | 6 | 7 | 5 | 5 | 7 | 5 | 5 | 7 | 5 | 5 | 7 | 5 | 5 |
| Example 23 | PTC-23 | 94 | 9 | 8 | 8 | 9 | 8 | 8 | 8 | 7 | 7 | 8 | 7 | 7 | 8 | 7 | 7 | 8 | 7 | 7 |
| Example 24 | PTC-24 | 94 | 9 | 8 | 8 | 9 | 8 | 8 | 8 | 7 | 7 | 8 | 7 | 7 | 8 | 7 | 7 | 8 | 7 | 7 |
| Example 25 | PTC-25 | 93 | 9 | 8 | 8 | 9 | 8 | 8 | 8 | 7 | 7 | 8 | 7 | 7 | 8 | 7 | 7 | 8 | 7 | 7 |
| Example 26 | PTC-26 | 89 | 8 | 7 | 7 | 8 | 7 | 7 | 7 | 6 | 6 | 7 | 6 | 6 | 7 | 6 | 6 | 7 | 6 | 6 |
| Example 27 | PTC-27 | 89 | 8 | 7 | 7 | 8 | 7 | 7 | 7 | 6 | 6 | 7 | 6 | 6 | 7 | 6 | 6 | 7 | 6 | 6 |
| Example 28 | PTC-28 | 88 | 8 | 7 | 7 | 8 | 7 | 7 | 7 | 6 | 6 | 7 | 6 | 6 | 7 | 6 | 6 | 7 | 6 | 6 |
| Example 29 | PTC-29 | 89 | 8 | 7 | 7 | 8 | 7 | 7 | 7 | 6 | 6 | 7 | 6 | 6 | 7 | 6 | 6 | 7 | 6 | 6 |
| Example 30 | PTC-30 | 93 | 9 | 8 | 8 | 9 | 8 | 8 | 8 | 7 | 7 | 8 | 7 | 7 | 8 | 7 | 7 | 8 | 7 | 7 |
| Example 31 | PTC-31 | 94 | 9 | 8 | 8 | 9 | 8 | 8 | 8 | 7 | 7 | 8 | 7 | 7 | 8 | 7 | 7 | 8 | 7 | 7 |
| Example 32 | PTC-32 | 93 | 9 | 8 | 8 | 9 | 8 | 8 | 8 | 7 | 7 | 8 | 7 | 7 | 8 | 7 | 7 | 8 | 7 | 7 |
| Example 33 | PTC-33 | 93 | 9 | 8 | 8 | 9 | 8 | 8 | 8 | 7 | 7 | 8 | 7 | 7 | 8 | 7 | 7 | 8 | 7 | 7 |
| Example 34 | PTC-34 | 89 | 8 | 7 | 7 | 8 | 7 | 7 | 7 | 6 | 6 | 7 | 6 | 6 | 7 | 6 | 6 | 7 | 6 | 6 |
| Example 35 | PTC-35 | 88 | 8 | 7 | 7 | 8 | 7 | 7 | 7 | 6 | 6 | 7 | 6 | 6 | 7 | 6 | 6 | 7 | 6 | 6 |
| Example 36 | PTC-36 | 88 | 8 | 7 | 7 | 8 | 7 | 7 | 7 | 6 | 6 | 7 | 6 | 6 | 7 | 6 | 6 | 7 | 6 | 6 |
| Example 37 | PTC-37 | 89 | 8 | 7 | 7 | 8 | 7 | 7 | 7 | 6 | 6 | 7 | 6 | 6 | 7 | 6 | 6 | 7 | 6 | 6 |
| Example 38 | PTC-38 | 93 | 9 | 8 | 8 | 9 | 8 | 8 | 8 | 7 | 7 | 8 | 7 | 7 | 8 | 7 | 7 | 8 | 7 | 7 |
| Example 39 | PTC-39 | 94 | 9 | 8 | 8 | 9 | 8 | 8 | 8 | 7 | 7 | 8 | 7 | 7 | 8 | 7 | 7 | 8 | 7 | 7 |
| Example 40 | PTC-40 | 92 | 9 | 8 | 8 | 9 | 8 | 8 | 8 | 7 | 7 | 8 | 7 | 7 | 8 | 7 | 7 | 8 | 7 | 7 |
| Example 41 | PTC-41 | 88 | 8 | 7 | 7 | 8 | 7 | 7 | 7 | 6 | 6 | 7 | 6 | 6 | 7 | 6 | 6 | 7 | 6 | 6 |
| Example 42 | PTC-42 | 92 | 9 | 8 | 8 | 9 | 8 | 8 | 8 | 7 | 7 | 8 | 7 | 7 | 8 | 7 | 7 | 8 | 7 | 7 |
| Example 43 | PTC-43 | 93 | 9 | 8 | 8 | 9 | 8 | 8 | 8 | 7 | 7 | 8 | 7 | 7 | 8 | 7 | 7 | 8 | 7 | 7 |

TABLE 4-2

| | Loose powder | | | | | | Powder foundation | | | | | | Sunscreen cream | | | | | |
| | Spreading | | | Hardness | | | Spreading | | | Hardness | | | Spreading | | | Hardness | | |
| | (1) | (2) | (3) | (1) | (2) | (3) | (1) | (2) | (3) | (1) | (2) | (3) | (1) | (2) | (3) | (1) | (2) | (3) |
|---|---|---|---|---|---|---|---|---|---|---|---|---|---|---|---|---|---|---|
| Example 1 | 8 | 7 | 7 | 8 | 7 | 7 | 8 | 7 | 7 | 8 | 7 | 7 | 8 | 7 | 7 | 8 | 7 | 7 |
| Example 2 | 8 | 7 | 7 | 8 | 7 | 7 | 8 | 7 | 7 | 8 | 7 | 7 | 8 | 7 | 7 | 8 | 7 | 7 |
| Example 3 | 8 | 7 | 7 | 8 | 7 | 7 | 8 | 7 | 7 | 8 | 7 | 7 | 8 | 7 | 7 | 8 | 7 | 7 |
| Example 4 | 8 | 7 | 7 | 8 | 7 | 7 | 8 | 7 | 7 | 8 | 7 | 7 | 8 | 7 | 7 | 8 | 7 | 7 |
| Example 5 | 7 | 6 | 6 | 7 | 6 | 6 | 7 | 6 | 6 | 7 | 6 | 6 | 7 | 6 | 6 | 7 | 6 | 6 |
| Example 6 | 8 | 7 | 7 | 8 | 7 | 7 | 8 | 7 | 7 | 8 | 7 | 7 | 8 | 7 | 7 | 8 | 7 | 7 |
| Example 7 | 8 | 7 | 7 | 8 | 7 | 7 | 8 | 7 | 7 | 8 | 7 | 7 | 8 | 7 | 7 | 8 | 7 | 7 |
| Example 8 | 8 | 7 | 7 | 8 | 7 | 7 | 8 | 7 | 7 | 8 | 7 | 7 | 8 | 7 | 7 | 8 | 7 | 7 |
| Example 9 | 8 | 7 | 7 | 8 | 7 | 7 | 8 | 7 | 7 | 8 | 7 | 7 | 8 | 7 | 7 | 8 | 7 | 7 |
| Example 10 | 7 | 6 | 6 | 7 | 6 | 6 | 7 | 6 | 6 | 7 | 6 | 6 | 7 | 6 | 6 | 7 | 6 | 6 |
| Example 11 | 7 | 6 | 6 | 7 | 6 | 6 | 7 | 6 | 6 | 7 | 6 | 6 | 7 | 6 | 6 | 7 | 6 | 6 |
| Example 12 | 8 | 7 | 7 | 8 | 7 | 7 | 8 | 7 | 7 | 8 | 7 | 7 | 8 | 7 | 7 | 8 | 7 | 7 |
| Example 13 | 7 | 6 | 6 | 7 | 6 | 6 | 7 | 6 | 6 | 7 | 6 | 6 | 7 | 6 | 6 | 7 | 6 | 6 |
| Example 14 | 8 | 7 | 7 | 8 | 7 | 7 | 8 | 7 | 7 | 8 | 7 | 7 | 8 | 7 | 7 | 8 | 7 | 7 |
| Example 15 | 7 | 6 | 6 | 7 | 6 | 6 | 7 | 6 | 6 | 7 | 6 | 6 | 7 | 6 | 6 | 7 | 6 | 6 |
| Example 16 | 8 | 7 | 7 | 8 | 7 | 7 | 8 | 7 | 7 | 8 | 7 | 7 | 8 | 7 | 7 | 8 | 7 | 7 |
| Example 17 | 7 | 6 | 6 | 7 | 6 | 6 | 7 | 6 | 6 | 7 | 6 | 6 | 7 | 6 | 6 | 7 | 6 | 6 |
| Example 18 | 8 | 7 | 7 | 8 | 7 | 7 | 8 | 7 | 7 | 8 | 7 | 7 | 8 | 7 | 7 | 8 | 7 | 7 |
| Example 19 | 8 | 7 | 7 | 8 | 7 | 7 | 8 | 7 | 7 | 8 | 7 | 7 | 8 | 7 | 7 | 8 | 7 | 7 |
| Example 20 | 7 | 6 | 6 | 7 | 6 | 6 | 7 | 6 | 6 | 7 | 6 | 6 | 7 | 6 | 6 | 7 | 6 | 6 |
| Example 21 | 8 | 7 | 7 | 8 | 7 | 7 | 8 | 7 | 7 | 8 | 7 | 7 | 8 | 7 | 7 | 8 | 7 | 7 |
| Example 22 | 7 | 6 | 6 | 7 | 6 | 6 | 7 | 6 | 6 | 7 | 6 | 6 | 7 | 6 | 6 | 7 | 6 | 6 |
| Example 23 | 9 | 8 | 8 | 9 | 8 | 8 | 9 | 8 | 8 | 9 | 8 | 8 | 9 | 8 | 8 | 9 | 8 | 8 |
| Example 24 | 9 | 8 | 8 | 9 | 8 | 8 | 9 | 8 | 8 | 9 | 8 | 8 | 9 | 8 | 8 | 9 | 8 | 8 |
| Example 25 | 9 | 8 | 8 | 9 | 8 | 8 | 9 | 8 | 8 | 9 | 8 | 8 | 9 | 8 | 8 | 9 | 8 | 8 |
| Example 26 | 8 | 7 | 7 | 8 | 7 | 7 | 8 | 7 | 7 | 8 | 7 | 7 | 8 | 7 | 7 | 8 | 7 | 7 |
| Example 27 | 8 | 7 | 7 | 8 | 7 | 7 | 8 | 7 | 7 | 8 | 7 | 7 | 8 | 7 | 7 | 8 | 7 | 7 |
| Example 28 | 8 | 7 | 7 | 8 | 7 | 7 | 8 | 7 | 7 | 8 | 7 | 7 | 8 | 7 | 7 | 8 | 7 | 7 |
| Example 29 | 8 | 7 | 7 | 8 | 7 | 7 | 8 | 7 | 7 | 8 | 7 | 7 | 8 | 7 | 7 | 8 | 7 | 7 |
| Example 30 | 9 | 8 | 8 | 9 | 8 | 8 | 9 | 8 | 8 | 9 | 8 | 8 | 9 | 8 | 8 | 9 | 8 | 8 |
| Example 31 | 9 | 8 | 8 | 9 | 8 | 8 | 9 | 8 | 8 | 9 | 8 | 8 | 9 | 8 | 8 | 9 | 8 | 8 |
| Example 32 | 9 | 8 | 8 | 9 | 8 | 8 | 9 | 8 | 8 | 9 | 8 | 8 | 9 | 8 | 8 | 9 | 8 | 8 |
| Example 33 | 9 | 8 | 8 | 9 | 8 | 8 | 9 | 8 | 8 | 9 | 8 | 8 | 9 | 8 | 8 | 9 | 8 | 8 |
| Example 34 | 8 | 7 | 7 | 8 | 7 | 7 | 8 | 7 | 7 | 8 | 7 | 7 | 8 | 7 | 7 | 8 | 7 | 7 |
| Example 35 | 8 | 7 | 7 | 8 | 7 | 7 | 8 | 7 | 7 | 8 | 7 | 7 | 8 | 7 | 7 | 8 | 7 | 7 |
| Example 36 | 8 | 7 | 7 | 8 | 7 | 7 | 8 | 7 | 7 | 8 | 7 | 7 | 8 | 7 | 7 | 8 | 7 | 7 |
| Example 37 | 8 | 7 | 7 | 8 | 7 | 7 | 8 | 7 | 7 | 8 | 7 | 7 | 8 | 7 | 7 | 8 | 7 | 7 |
| Example 38 | 9 | 8 | 8 | 9 | 8 | 8 | 9 | 8 | 8 | 9 | 8 | 8 | 9 | 8 | 8 | 9 | 8 | 8 |
| Example 39 | 9 | 8 | 8 | 9 | 8 | 8 | 9 | 8 | 8 | 9 | 8 | 8 | 9 | 8 | 8 | 9 | 8 | 8 |
| Example 40 | 9 | 8 | 8 | 9 | 8 | 8 | 9 | 8 | 8 | 9 | 8 | 8 | 9 | 8 | 8 | 9 | 8 | 8 |
| Example 41 | 8 | 7 | 7 | 8 | 7 | 7 | 8 | 7 | 7 | 8 | 7 | 7 | 8 | 7 | 7 | 8 | 7 | 7 |
| Example 42 | 9 | 8 | 8 | 9 | 8 | 8 | 9 | 8 | 8 | 9 | 8 | 8 | 9 | 8 | 8 | 9 | 8 | 8 |
| Example 43 | 9 | 8 | 8 | 9 | 8 | 8 | 9 | 8 | 8 | 9 | 8 | 8 | 9 | 8 | 8 | 9 | 8 | 8 |

TABLE 4-3

| | All-in-one gel | | | | | | Foundation primer | | | | | | Lip primer | | | | | |
| | Spreading | | | Hardness | | | Spreading | | | Hardness | | | Spreading | | | Hardness | | |
| | (1) | (2) | (3) | (1) | (2) | (3) | (1) | (2) | (3) | (1) | (2) | (3) | (1) | (2) | (3) | (1) | (2) | (3) |
|---|---|---|---|---|---|---|---|---|---|---|---|---|---|---|---|---|---|---|
| Example 1 | 8 | 6 | 6 | 8 | 6 | 6 | 8 | 6 | 6 | 8 | 6 | 6 | 8 | 6 | 6 | 8 | 6 | 6 |
| Example 2 | 8 | 6 | 6 | 8 | 6 | 6 | 8 | 6 | 6 | 8 | 6 | 6 | 8 | 6 | 6 | 8 | 6 | 6 |
| Example 3 | 8 | 6 | 6 | 8 | 6 | 6 | 8 | 6 | 6 | 8 | 6 | 6 | 8 | 6 | 6 | 8 | 6 | 6 |
| Example 4 | 8 | 6 | 6 | 8 | 6 | 6 | 8 | 6 | 6 | 8 | 6 | 6 | 8 | 6 | 6 | 8 | 6 | 6 |
| Example 5 | 7 | 5 | 5 | 7 | 5 | 5 | 7 | 5 | 5 | 7 | 5 | 5 | 7 | 5 | 5 | 7 | 5 | 5 |
| Example 6 | 8 | 6 | 6 | 8 | 6 | 6 | 8 | 6 | 6 | 8 | 6 | 6 | 8 | 6 | 6 | 8 | 6 | 6 |
| Example 7 | 8 | 6 | 6 | 8 | 6 | 6 | 8 | 6 | 6 | 8 | 6 | 6 | 8 | 6 | 6 | 8 | 6 | 6 |
| Example 8 | 8 | 6 | 6 | 8 | 6 | 6 | 8 | 6 | 6 | 8 | 6 | 6 | 8 | 6 | 6 | 8 | 6 | 6 |
| Example 9 | 8 | 6 | 6 | 8 | 6 | 6 | 8 | 6 | 6 | 8 | 6 | 6 | 8 | 6 | 6 | 8 | 6 | 6 |
| Example 10 | 7 | 5 | 5 | 7 | 5 | 5 | 7 | 5 | 5 | 7 | 5 | 5 | 7 | 5 | 5 | 7 | 5 | 5 |
| Example 11 | 7 | 5 | 5 | 7 | 5 | 5 | 7 | 5 | 5 | 7 | 5 | 5 | 7 | 5 | 5 | 7 | 5 | 5 |
| Example 12 | 8 | 6 | 6 | 8 | 6 | 6 | 8 | 6 | 6 | 8 | 6 | 6 | 8 | 6 | 6 | 8 | 6 | 6 |
| Example 13 | 7 | 5 | 5 | 7 | 5 | 5 | 7 | 5 | 5 | 7 | 5 | 5 | 7 | 5 | 5 | 7 | 5 | 5 |
| Example 14 | 8 | 6 | 6 | 8 | 6 | 6 | 8 | 6 | 6 | 8 | 6 | 6 | 8 | 6 | 6 | 8 | 6 | 6 |
| Example 15 | 7 | 5 | 5 | 7 | 5 | 5 | 7 | 5 | 5 | 7 | 5 | 5 | 7 | 5 | 5 | 7 | 5 | 5 |
| Example 16 | 8 | 6 | 6 | 8 | 6 | 6 | 8 | 6 | 6 | 8 | 6 | 6 | 8 | 6 | 6 | 8 | 6 | 6 |
| Example 17 | 7 | 5 | 5 | 7 | 5 | 5 | 7 | 5 | 5 | 7 | 5 | 5 | 7 | 5 | 5 | 7 | 5 | 5 |
| Example 18 | 8 | 6 | 6 | 8 | 6 | 6 | 8 | 6 | 6 | 8 | 6 | 6 | 8 | 6 | 6 | 8 | 6 | 6 |

TABLE 4-3-continued

| | All-in-one gel | | | | | | Foundation primer | | | | | | Lip primer | | | | | |
|---|---|---|---|---|---|---|---|---|---|---|---|---|---|---|---|---|---|---|
| | Spreading | | | Hardness | | | Spreading | | | Hardness | | | Spreading | | | Hardness | | |
| | (1) | (2) | (3) | (1) | (2) | (3) | (1) | (2) | (3) | (1) | (2) | (3) | (1) | (2) | (3) | (1) | (2) | (3) |
| Example 19 | 8 | 6 | 6 | 8 | 6 | 6 | 8 | 6 | 6 | 8 | 6 | 6 | 8 | 6 | 6 | 8 | 6 | 6 |
| Example 20 | 7 | 5 | 5 | 7 | 5 | 5 | 7 | 5 | 5 | 7 | 5 | 5 | 7 | 5 | 5 | 7 | 5 | 5 |
| Example 21 | 8 | 6 | 6 | 8 | 6 | 6 | 8 | 6 | 6 | 8 | 6 | 6 | 8 | 6 | 6 | 8 | 6 | 6 |
| Example 22 | | | | | | | | | | | | | | | | | | |
| Example 23 | 8 | 7 | 7 | 8 | 7 | 7 | 8 | 7 | 7 | 8 | 7 | 7 | 8 | 7 | 7 | 8 | 7 | 7 |
| Example 24 | 8 | 7 | 7 | 8 | 7 | 7 | 8 | 7 | 7 | 8 | 7 | 7 | 8 | 7 | 7 | 8 | 7 | 7 |
| Example 25 | 8 | 7 | 7 | 8 | 7 | 7 | 8 | 7 | 7 | 8 | 7 | 7 | 8 | 7 | 7 | 8 | 7 | 7 |
| Example 26 | 7 | 6 | 6 | 7 | 6 | 6 | 7 | 6 | 6 | 7 | 6 | 6 | 7 | 6 | 6 | 7 | 6 | 6 |
| Example 27 | 7 | 6 | 6 | 7 | 6 | 6 | 7 | 6 | 6 | 7 | 6 | 6 | 7 | 6 | 6 | 7 | 6 | 6 |
| Example 28 | 7 | 6 | 6 | 7 | 6 | 6 | 7 | 6 | 6 | 7 | 6 | 6 | 7 | 6 | 6 | 7 | 6 | 6 |
| Example 29 | 7 | 6 | 6 | 7 | 6 | 6 | 7 | 6 | 6 | 7 | 6 | 6 | 7 | 6 | 6 | 7 | 6 | 6 |
| Example 30 | 8 | 7 | 7 | 8 | 7 | 7 | 8 | 7 | 7 | 8 | 7 | 7 | 8 | 7 | 7 | 8 | 7 | 7 |
| Example 31 | 8 | 7 | 7 | 8 | 7 | 7 | 8 | 7 | 7 | 8 | 7 | 7 | 8 | 7 | 7 | 8 | 7 | 7 |
| Example 32 | 8 | 7 | 7 | 8 | 7 | 7 | 8 | 7 | 7 | 8 | 7 | 7 | 8 | 7 | 7 | 8 | 7 | 7 |
| Example 33 | 8 | 7 | 7 | 8 | 7 | 7 | 8 | 7 | 7 | 8 | 7 | 7 | 8 | 7 | 7 | 8 | 7 | 7 |
| Example 34 | 7 | 6 | 6 | 7 | 6 | 6 | 7 | 6 | 6 | 7 | 6 | 6 | 7 | 6 | 6 | 7 | 6 | 6 |
| Example 35 | 7 | 6 | 6 | 7 | 6 | 6 | 7 | 6 | 6 | 7 | 6 | 6 | 7 | 6 | 6 | 7 | 6 | 6 |
| Example 36 | 7 | 6 | 6 | 7 | 6 | 6 | 7 | 6 | 6 | 7 | 6 | 6 | 7 | 6 | 6 | 7 | 6 | 6 |
| Example 37 | 7 | 6 | 6 | 7 | 6 | 6 | 7 | 6 | 6 | 7 | 6 | 6 | 7 | 6 | 6 | 7 | 6 | 6 |
| Example 38 | 8 | 7 | 7 | 8 | 7 | 7 | 8 | 7 | 7 | 8 | 7 | 7 | 8 | 7 | 7 | 8 | 7 | 7 |
| Example 39 | 8 | 7 | 7 | 8 | 7 | 7 | 8 | 7 | 7 | 8 | 7 | 7 | 8 | 7 | 7 | 8 | 7 | 7 |
| Example 40 | 8 | 7 | 7 | 8 | 7 | 7 | 8 | 7 | 7 | 8 | 7 | 7 | 8 | 7 | 7 | 8 | 7 | 7 |
| Example 41 | 7 | 6 | 6 | 7 | 6 | 6 | 7 | 6 | 6 | 7 | 6 | 6 | 7 | 6 | 6 | 7 | 6 | 6 |
| Example 42 | 8 | 7 | 7 | 8 | 7 | 7 | 8 | 7 | 7 | 8 | 7 | 7 | 8 | 7 | 7 | 8 | 7 | 7 |
| Example 43 | 8 | 7 | 7 | 8 | 7 | 7 | 8 | 7 | 7 | 8 | 7 | 7 | 8 | 7 | 7 | 8 | 7 | 7 |

TABLE 4-4

| | Body powder | | | | | | Solid powder eyeshadow | | | | | |
|---|---|---|---|---|---|---|---|---|---|---|---|---|
| | Spreading | | | Hardness | | | Spreading | | | Hardness | | |
| | (1) | (2) | (3) | (1) | (2) | (3) | (1) | (2) | (3) | (1) | (2) | (3) |
| Example 1 | 8 | 7 | 7 | 8 | 7 | 7 | 8 | 7 | 7 | 8 | 7 | 7 |
| Example 2 | 8 | 7 | 7 | 8 | 7 | 7 | 8 | 7 | 7 | 8 | 7 | 7 |
| Example 3 | 8 | 7 | 7 | 8 | 7 | 7 | 8 | 7 | 7 | 8 | 7 | 7 |
| Example 4 | 8 | 7 | 7 | 8 | 7 | 7 | 8 | 7 | 7 | 8 | 7 | 7 |
| Example 5 | 7 | 6 | 6 | 7 | 6 | 6 | 7 | 6 | 6 | 7 | 6 | 6 |
| Example 6 | 8 | 7 | 7 | 8 | 7 | 7 | 8 | 7 | 7 | 8 | 7 | 7 |
| Example 7 | 8 | 7 | 7 | 8 | 7 | 7 | 8 | 7 | 7 | 8 | 7 | 7 |
| Example 8 | 8 | 7 | 7 | 8 | 7 | 7 | 8 | 7 | 7 | 8 | 7 | 7 |
| Example 9 | 8 | 7 | 7 | 8 | 7 | 7 | 8 | 7 | 7 | 8 | 7 | 7 |
| Example 10 | 7 | 6 | 6 | 7 | 6 | 6 | 7 | 6 | 6 | 7 | 6 | 6 |
| Example 11 | 7 | 6 | 6 | 7 | 6 | 6 | 7 | 6 | 6 | 7 | 6 | 6 |
| Example 12 | 8 | 7 | 7 | 8 | 7 | 7 | 8 | 7 | 7 | 8 | 7 | 7 |
| Example 13 | 7 | 6 | 6 | 7 | 6 | 6 | 7 | 6 | 6 | 7 | 6 | 6 |
| Example 14 | 8 | 7 | 7 | 8 | 7 | 7 | 8 | 7 | 7 | 8 | 7 | 7 |
| Example 15 | 7 | 6 | 6 | 7 | 6 | 6 | 7 | 6 | 6 | 7 | 6 | 6 |
| Example 16 | 8 | 7 | 7 | 8 | 7 | 7 | 8 | 7 | 7 | 8 | 7 | 7 |
| Example 17 | 7 | 6 | 6 | 7 | 6 | 6 | 7 | 6 | 6 | 7 | 6 | 6 |
| Example 18 | 8 | 7 | 7 | 8 | 7 | 7 | 8 | 7 | 7 | 8 | 7 | 7 |
| Example 19 | 8 | 7 | 7 | 8 | 7 | 7 | 8 | 7 | 7 | 8 | 7 | 7 |
| Example 20 | 7 | 6 | 6 | 7 | 6 | 6 | 7 | 6 | 6 | 7 | 6 | 6 |
| Example 21 | 8 | 7 | 7 | 8 | 7 | 7 | 8 | 7 | 7 | 8 | 7 | 7 |
| Example 22 | 7 | 6 | 6 | 7 | 6 | 6 | 7 | 6 | 6 | 7 | 6 | 6 |
| Example 23 | 9 | 8 | 8 | 9 | 8 | 8 | 9 | 8 | 8 | 9 | 8 | 8 |
| Example 24 | 9 | 8 | 8 | 9 | 8 | 8 | 9 | 8 | 8 | 9 | 8 | 8 |
| Example 25 | 9 | 8 | 8 | 9 | 8 | 8 | 9 | 8 | 8 | 9 | 8 | 8 |
| Example 26 | 8 | 7 | 7 | 8 | 7 | 7 | 8 | 7 | 7 | 8 | 7 | 7 |
| Example 27 | 8 | 7 | 7 | 8 | 7 | 7 | 8 | 7 | 7 | 8 | 7 | 7 |
| Example 28 | 8 | 7 | 7 | 8 | 7 | 7 | 8 | 7 | 7 | 8 | 7 | 7 |
| Example 29 | 8 | 7 | 7 | 8 | 7 | 7 | 8 | 7 | 7 | 8 | 7 | 7 |
| Example 30 | 9 | 8 | 8 | 9 | 8 | 8 | 9 | 8 | 8 | 9 | 8 | 8 |
| Example 31 | 9 | 8 | 8 | 9 | 8 | 8 | 9 | 8 | 8 | 9 | 8 | 8 |
| Example 32 | 9 | 8 | 8 | 9 | 8 | 8 | 9 | 8 | 8 | 9 | 8 | 8 |
| Example 33 | 9 | 8 | 8 | 9 | 8 | 8 | 9 | 8 | 8 | 9 | 8 | 8 |
| Example 34 | 8 | 7 | 7 | 8 | 7 | 7 | 8 | 7 | 7 | 8 | 7 | 7 |
| Example 35 | 8 | 7 | 7 | 8 | 7 | 7 | 8 | 7 | 7 | 8 | 7 | 7 |
| Example 36 | 8 | 7 | 7 | 8 | 7 | 7 | 8 | 7 | 7 | 8 | 7 | 7 |
| Example 37 | 8 | 7 | 7 | 8 | 7 | 7 | 8 | 7 | 7 | 8 | 7 | 7 |
| Example 38 | 9 | 8 | 8 | 9 | 8 | 8 | 9 | 8 | 8 | 9 | 8 | 8 |
| Example 39 | 9 | 8 | 8 | 9 | 8 | 8 | 9 | 8 | 8 | 9 | 8 | 8 |
| Example 40 | 9 | 8 | 8 | 9 | 8 | 8 | 9 | 8 | 8 | 9 | 8 | 8 |
| Example 41 | 8 | 7 | 7 | 8 | 7 | 7 | 8 | 7 | 7 | 8 | 7 | 7 |
| Example 42 | 9 | 8 | 8 | 9 | 8 | 8 | 9 | 8 | 8 | 9 | 8 | 8 |
| Example 43 | 9 | 8 | 8 | 9 | 8 | 8 | 9 | 8 | 8 | 9 | 8 | 8 |

TABLE 4-5

| | | Particles | | | | | | | Liquid foundation | | | | | | Milky lotion | | | | | |
|---|---|---|---|---|---|---|---|---|---|---|---|---|---|---|---|---|---|---|---|---|
| | Particle number | Percentage biodegradability % | Spreading | | | Hardness | | | Spreading | | | Hardness | | | Spreading | | | Hardness | | |
| | | | (1) | (2) | (3) | (1) | (2) | (3) | (1) | (2) | (3) | (1) | (2) | (3) | (1) | (2) | (3) | (1) | (2) | (3) |
| Example 44 | PTC-44 | 79 | 10 | 9 | 9 | 10 | 9 | 9 | 10 | 9 | 9 | 10 | 9 | 9 | 10 | 9 | 9 | 10 | 9 | 9 |
| Example 45 | PTC-45 | 81 | 10 | 9 | 9 | 10 | 9 | 9 | 10 | 9 | 9 | 10 | 9 | 9 | 10 | 9 | 9 | 10 | 9 | 9 |
| Example 46 | PTC-46 | 78 | 10 | 9 | 9 | 10 | 9 | 9 | 10 | 9 | 9 | 10 | 9 | 9 | 10 | 9 | 9 | 10 | 9 | 9 |

TABLE 4-5-continued

| | Particle number | Particles Percentage biodegradability % | Spreading (1) | (2) | (3) | Hardness (1) | (2) | (3) | Liquid foundation Spreading (1) | (2) | (3) | Hardness (1) | (2) | (3) | Milky lotion Spreading (1) | (2) | (3) | Hardness (1) | (2) | (3) |
|---|---|---|---|---|---|---|---|---|---|---|---|---|---|---|---|---|---|---|---|---|
| Example 47 | PTC-47 | 79 | 10 | 9 | 9 | 10 | 9 | 9 | 10 | 9 | 9 | 10 | 9 | 9 | 10 | 9 | 9 | 10 | 9 | 9 |
| Example 48 | PTC-48 | 76 | 10 | 9 | 9 | 10 | 9 | 9 | 10 | 9 | 9 | 10 | 9 | 9 | 10 | 9 | 9 | 10 | 9 | 9 |
| Example 49 | PTC-49 | 78 | 10 | 9 | 9 | 10 | 9 | 9 | 10 | 9 | 9 | 10 | 9 | 9 | 10 | 9 | 9 | 10 | 9 | 9 |
| Example 50 | PTC-50 | 82 | 10 | 9 | 9 | 10 | 9 | 9 | 10 | 9 | 9 | 0 | 9 | 9 | 10 | 9 | 9 | 10 | 9 | 9 |
| Example 51 | PTC-51 | 74 | 9 | 8 | 8 | 9 | 8 | 8 | 9 | 8 | 8 | 9 | 8 | 8 | 9 | 8 | 8 | 9 | 8 | 8 |
| Example 52 | PTC-52 | 79 | 10 | 9 | 9 | 10 | 9 | 9 | 10 | 9 | 9 | 10 | 9 | 9 | 10 | 9 | 9 | 10 | 9 | 9 |
| Example 53 | PTC-53 | 72 | 9 | 8 | 8 | 9 | 8 | 8 | 9 | 8 | 8 | 9 | 8 | 8 | 9 | 8 | 8 | 9 | 8 | 8 |
| Example 54 | PTC-54 | 80 | 10 | 9 | 9 | 10 | 9 | 9 | 10 | 9 | 9 | 10 | 9 | 9 | 10 | 9 | 9 | 10 | 9 | 9 |
| Example 55 | PTC-55 | 82 | 10 | 9 | 9 | 10 | 9 | 9 | 10 | 9 | 9 | 10 | 9 | 9 | 10 | 9 | 9 | 10 | 9 | 9 |
| Example 56 | PTC-56 | 81 | 10 | 9 | 9 | 10 | 9 | 9 | 10 | 9 | 9 | 10 | 9 | 9 | 10 | 9 | 9 | 10 | 9 | 9 |
| Example 57 | PTC-57 | 79 | 10 | 9 | 9 | 10 | 9 | 9 | 10 | 9 | 9 | 10 | 9 | 9 | 10 | 9 | 9 | 10 | 9 | 9 |
| Example 58 | PTC-58 | 78 | 10 | 9 | 9 | 10 | 9 | 9 | 10 | 9 | 9 | 10 | 9 | 9 | 10 | 9 | 9 | 10 | 9 | 9 |
| Example 59 | PTC-59 | 79 | 10 | 9 | 9 | 10 | 9 | 9 | 10 | 9 | 9 | 10 | 9 | 9 | 10 | 9 | 9 | 10 | 9 | 9 |
| Example 60 | PTC-60 | 78 | 10 | 9 | 9 | 10 | 9 | 9 | 10 | 9 | 9 | 10 | 9 | 9 | 10 | 9 | 9 | 10 | 9 | 9 |
| Example 61 | PTC-61 | 70 | 10 | 10 | 10 | 10 | 10 | 10 | 10 | 10 | 10 | 10 | 10 | 10 | 10 | 10 | 10 | 10 | 10 | 10 |
| Example 62 | PTC-62 | 70 | 10 | 10 | 10 | 10 | 10 | 10 | 10 | 10 | 10 | 10 | 10 | 10 | 10 | 10 | 10 | 10 | 10 | 10 |
| Example 63 | PTC-63 | 71 | 10 | 10 | 10 | 10 | 10 | 10 | 10 | 10 | 10 | 10 | 10 | 10 | 10 | 10 | 10 | 10 | 10 | 10 |
| Example 64 | PTC-64 | 70 | 10 | 10 | 10 | 10 | 10 | 10 | 10 | 10 | 10 | 10 | 10 | 10 | 10 | 10 | 10 | 10 | 10 | 10 |
| Comparative Example 1 | PTC-65 | 93 | 4 | 3 | 2 | 4 | 3 | 2 | 4 | 3 | 2 | 4 | 3 | 2 | 4 | 3 | 2 | 4 | 3 | 2 |
| Comparative Example 2 | PTC-66 | 93 | 4 | 3 | 2 | 4 | 3 | 2 | 4 | 3 | 2 | 4 | 3 | 2 | 4 | 3 | 2 | 4 | 3 | 2 |
| Comparative Example 3 | PTC-67 | 90 | 5 | 3 | 3 | 5 | 3 | 3 | 5 | 3 | 3 | 5 | 3 | 3 | 5 | 3 | 3 | 5 | 3 | 3 |
| Comparative Example 4 | PTC-68 | 89 | 5 | 3 | 3 | 5 | 3 | 3 | 5 | 3 | 3 | 5 | 3 | 3 | 5 | 3 | 3 | 5 | 3 | 3 |
| Comparative Example 5 | PTC-69 | 87 | 5 | 4 | 3 | 5 | 4 | 3 | 5 | 4 | 3 | 5 | 4 | 3 | 5 | 4 | 3 | 5 | 4 | 3 |
| Comparative Example 6 | PTC-70 | 87 | 5 | 4 | 3 | 5 | 4 | 3 | 5 | 4 | 3 | 5 | 4 | 3 | 5 | 4 | 3 | 5 | 4 | 3 |
| Comparative Example 7 | PTC-71 | 70 | 5 | 4 | 4 | 5 | 4 | 4 | 5 | 4 | 4 | 5 | 4 | 4 | 5 | 4 | 4 | 5 | 4 | 4 |
| Comparative Example 8 | PTC-72 | 70 | 5 | 4 | 4 | 5 | 4 | 4 | 5 | 4 | 4 | 5 | 4 | 4 | 5 | 4 | 4 | 5 | 4 | 4 |
| Comparative Example 9 | PTC-101 | 79 | 4 | 3 | 2 | 4 | 3 | 2 | 4 | 3 | 2 | 4 | 3 | 2 | 4 | 3 | 2 | 4 | 3 | 2 |
| Comparative Example 10 | PTC-102 | 78 | 4 | 3 | 2 | 4 | 3 | 2 | 4 | 3 | 2 | 4 | 3 | 2 | 4 | 3 | 2 | 4 | 3 | 2 |
| Comparative Example 11 | PTC-103 | 17 | 5 | 3 | 3 | 5 | 3 | 3 | 5 | 3 | 3 | 5 | 3 | 3 | 5 | 3 | 3 | 5 | 3 | 3 |
| Comparative Example 12 | PTC-104 | 25 | 5 | 3 | 3 | 5 | 3 | 3 | 5 | 3 | 3 | 5 | 3 | 3 | 5 | 3 | 3 | 5 | 3 | 3 |
| Comparative Example 13 | PTC-105 | 24 | 4 | 3 | 2 | 4 | 3 | 2 | 4 | 3 | 2 | 4 | 3 | 2 | 4 | 3 | 2 | 4 | 3 | 2 |
| Comparative Example 14 | PTC-111 | 85 | 5 | 3 | 3 | 5 | 3 | 3 | 5 | 3 | 3 | 5 | 3 | 3 | 5 | 3 | 3 | 5 | 3 | 3 |
| Comparative Example 15 | PTC-112 | 88 | 5 | 3 | 3 | 5 | 3 | 3 | 5 | 3 | 3 | 5 | 3 | 3 | 5 | 3 | 3 | 5 | 3 | 3 |

TABLE 4-6

| | Loose powder Spreading (1) | (2) | (3) | Hardness (1) | (2) | (3) | Powder foundation Spreading (1) | (2) | (3) | Hardness (1) | (2) | (3) | Sunscreen cream Spreading (1) | (2) | (3) | Hardness (1) | (2) | (3) |
|---|---|---|---|---|---|---|---|---|---|---|---|---|---|---|---|---|---|---|
| Example 44 | 10 | 9 | 9 | 10 | 9 | 9 | 10 | 9 | 9 | 10 | 9 | 9 | 10 | 9 | 9 | 10 | 9 | 9 |
| Example 45 | 10 | 9 | 9 | 10 | 9 | 9 | 10 | 9 | 9 | 10 | 9 | 9 | 10 | 9 | 9 | 10 | 9 | 9 |
| Example 46 | 10 | 9 | 9 | 10 | 9 | 9 | 10 | 9 | 9 | 10 | 9 | 9 | 10 | 9 | 9 | 10 | 9 | 9 |
| Example 47 | 10 | 9 | 9 | 10 | 9 | 9 | 10 | 9 | 9 | 10 | 9 | 9 | 10 | 9 | 9 | 10 | 9 | 9 |
| Example 48 | 10 | 9 | 9 | 10 | 9 | 9 | 10 | 9 | 9 | 10 | 9 | 9 | 10 | 9 | 9 | 10 | 9 | 9 |
| Example 49 | 10 | 9 | 9 | 10 | 9 | 9 | 10 | 9 | 9 | 10 | 9 | 9 | 10 | 9 | 9 | 10 | 9 | 9 |
| Example 50 | 10 | 9 | 9 | 10 | 9 | 9 | 10 | 9 | 9 | 10 | 9 | 9 | 10 | 9 | 9 | 10 | 9 | 9 |
| Example 51 | 9 | 8 | 8 | 9 | 8 | 8 | 9 | 8 | 8 | 9 | 8 | 8 | 9 | 8 | 8 | 9 | 8 | 8 |
| Example 52 | 10 | 9 | 9 | 10 | 9 | 9 | 10 | 9 | 9 | 10 | 9 | 9 | 10 | 9 | 9 | 10 | 9 | 9 |
| Example 53 | 9 | 8 | 8 | 9 | 8 | 8 | 9 | 8 | 8 | 9 | 8 | 8 | 9 | 8 | 8 | 9 | 8 | 8 |
| Example 54 | 10 | 9 | 9 | 10 | 9 | 9 | 10 | 9 | 9 | 10 | 9 | 9 | 10 | 9 | 9 | 10 | 9 | 9 |
| Example 55 | 10 | 9 | 9 | 10 | 9 | 9 | 10 | 9 | 9 | 10 | 9 | 9 | 10 | 9 | 9 | 10 | 9 | 9 |

TABLE 4-6-continued

| | Loose powder | | | | | | Powder foundation | | | | | | Sunscreen cream | | | | | |
|---|---|---|---|---|---|---|---|---|---|---|---|---|---|---|---|---|---|---|
| | Spreading | | | Hardness | | | Spreading | | | Hardness | | | Spreading | | | Hardness | | |
| | (1) | (2) | (3) | (1) | (2) | (3) | (1) | (2) | (3) | (1) | (2) | (3) | (1) | (2) | (3) | (1) | (2) | (3) |
| Example 56 | 10 | 9 | 9 | 10 | 9 | 9 | 10 | 9 | 9 | 10 | 9 | 9 | 10 | 9 | 9 | 10 | 9 | 9 |
| Example 57 | 10 | 9 | 9 | 10 | 9 | 9 | 10 | 9 | 9 | 10 | 9 | 9 | 10 | 9 | 9 | 10 | 9 | 9 |
| Example 58 | 10 | 9 | 9 | 10 | 9 | 9 | 10 | 9 | 9 | 10 | 9 | 9 | 10 | 9 | 9 | 10 | 9 | 9 |
| Example 59 | 10 | 9 | 9 | 10 | 9 | 9 | 10 | 9 | 9 | 10 | 9 | 9 | 10 | 9 | 9 | 10 | 9 | 9 |
| Example 60 | 10 | 9 | 9 | 10 | 9 | 9 | 10 | 9 | 9 | 10 | 9 | 9 | 10 | 9 | 9 | 10 | 9 | 9 |
| Example 61 | 10 | 10 | 10 | 10 | 10 | 10 | 10 | 10 | 10 | 10 | 10 | 10 | 10 | 10 | 10 | 10 | 10 | 10 |
| Example 62 | 10 | 10 | 10 | 10 | 10 | 10 | 10 | 10 | 10 | 10 | 10 | 10 | 10 | 10 | 10 | 10 | 10 | 10 |
| Example 63 | 10 | 10 | 10 | 10 | 10 | 10 | 10 | 10 | 10 | 10 | 10 | 10 | 10 | 10 | 10 | 10 | 10 | 10 |
| Example 64 | 10 | 10 | 10 | 10 | 10 | 10 | 10 | 10 | 10 | 10 | 10 | 10 | 10 | 10 | 10 | 10 | 10 | 10 |
| Comparative Example 1 | 4 | 3 | 2 | 4 | 3 | 2 | 4 | 3 | 2 | 4 | 3 | 2 | 4 | 3 | 2 | 4 | 3 | 2 |
| Comparative Example 2 | 4 | 3 | 2 | 4 | 3 | 2 | 4 | 3 | 2 | 4 | 3 | 2 | 4 | 3 | 2 | 4 | 3 | 2 |
| Comparative Example 3 | 5 | 3 | 3 | 5 | 3 | 3 | 5 | 3 | 3 | 5 | 3 | 3 | 5 | 3 | 3 | 5 | 3 | 3 |
| Comparative Example 4 | 5 | 3 | 3 | 5 | 3 | 3 | 5 | 3 | 3 | 5 | 3 | 3 | 5 | 3 | 3 | 5 | 3 | 3 |
| Comparative Example 5 | 5 | 4 | 3 | 5 | 4 | 3 | 5 | 4 | 3 | 5 | 4 | 3 | 5 | 4 | 3 | 5 | 4 | 3 |
| Comparative Example 6 | 5 | 4 | 3 | 5 | 4 | 3 | 5 | 4 | 3 | 5 | 4 | 3 | 5 | 4 | 3 | 5 | 4 | 3 |
| Comparative Example 7 | 5 | 4 | 4 | 5 | 4 | 4 | 5 | 4 | 4 | 5 | 4 | 4 | 5 | 4 | 4 | 5 | 4 | 4 |
| Comparative Example 8 | 5 | 4 | 4 | 5 | 4 | 4 | 5 | 4 | 4 | 5 | 4 | 4 | 5 | 4 | 4 | 5 | 4 | 4 |
| Comparative Example 9 | 4 | 3 | 2 | 4 | 3 | 2 | 4 | 3 | 2 | 4 | 3 | 2 | 4 | 3 | 2 | 4 | 3 | 2 |
| Comparative Example 10 | 4 | 3 | 2 | 4 | 3 | 2 | 4 | 3 | 2 | 4 | 3 | 2 | 4 | 3 | 2 | 4 | 3 | 2 |
| Comparative Example 11 | 5 | 3 | 3 | 5 | 3 | 3 | 5 | 3 | 3 | 5 | 3 | 3 | 5 | 3 | 3 | 5 | 3 | 3 |
| Comparative Example 12 | 5 | 3 | 3 | 5 | 3 | 3 | 5 | 3 | 3 | 5 | 3 | 3 | 5 | 3 | 3 | 5 | 3 | 3 |
| Comparative Example 13 | 4 | 3 | 2 | 4 | 3 | 2 | 4 | 3 | 2 | 4 | 3 | 2 | 4 | 3 | 2 | 4 | 3 | 2 |
| Comparative Example 14 | 5 | 3 | 3 | 5 | 3 | 3 | 5 | 3 | 3 | 5 | 3 | 3 | 5 | 3 | 3 | 5 | 3 | 3 |
| Comparative Example 15 | 5 | 3 | 3 | 5 | 3 | 3 | 5 | 3 | 3 | 5 | 3 | 3 | 5 | 3 | 3 | 5 | 3 | 3 |

TABLE 4-7

| | All-in-one gel | | | | | | Foundation primer | | | | | | Lip primer | | | | | |
|---|---|---|---|---|---|---|---|---|---|---|---|---|---|---|---|---|---|---|
| | Spreading | | | Hardness | | | Spreading | | | Hardness | | | Spreading | | | Hardness | | |
| | (1) | (2) | (3) | (1) | (2) | (3) | (1) | (2) | (3) | (1) | (2) | (3) | (1) | (2) | (3) | (1) | (2) | (3) |
| Example 44 | 10 | 9 | 9 | 10 | 9 | 9 | 10 | 9 | 9 | 10 | 9 | 9 | 10 | 9 | 9 | 10 | 9 | 9 |
| Example 45 | 10 | 9 | 9 | 10 | 9 | 9 | 10 | 9 | 9 | 10 | 9 | 9 | 10 | 9 | 9 | 10 | 9 | 9 |
| Example 46 | 10 | 9 | 9 | 10 | 9 | 9 | 10 | 9 | 9 | 10 | 9 | 9 | 10 | 9 | 9 | 10 | 9 | 9 |
| Example 47 | 10 | 9 | 9 | 10 | 9 | 9 | 10 | 9 | 9 | 10 | 9 | 9 | 10 | 9 | 9 | 10 | 9 | 9 |
| Example 48 | 10 | 9 | 9 | 10 | 9 | 9 | 10 | 9 | 9 | 10 | 9 | 9 | 10 | 9 | 9 | 10 | 9 | 9 |
| Example 49 | 10 | 9 | 9 | 10 | 9 | 9 | 10 | 9 | 9 | 10 | 9 | 9 | 10 | 9 | 9 | 10 | 9 | 9 |
| Example 50 | 10 | 9 | 9 | 10 | 9 | 9 | 10 | 9 | 9 | 10 | 9 | 9 | 10 | 9 | 9 | 10 | 9 | 9 |
| Example 51 | 9 | 8 | 8 | 9 | 8 | 8 | 9 | 8 | 8 | 9 | 8 | 8 | 9 | 8 | 8 | 9 | 8 | 8 |
| Example 52 | 10 | 9 | 9 | 10 | 9 | 9 | 10 | 9 | 9 | 10 | 9 | 9 | 10 | 9 | 9 | 10 | 9 | 9 |
| Example 53 | 9 | 8 | 8 | 9 | 8 | 8 | 9 | 8 | 8 | 9 | 8 | 8 | 9 | 8 | 8 | 9 | 8 | 8 |
| Example 54 | 10 | 9 | 9 | 10 | 9 | 9 | 10 | 9 | 9 | 10 | 9 | 9 | 10 | 9 | 9 | 10 | 9 | 9 |
| Example 55 | 10 | 9 | 9 | 10 | 9 | 9 | 10 | 9 | 9 | 10 | 9 | 9 | 10 | 9 | 9 | 10 | 9 | 9 |
| Example 56 | 10 | 9 | 9 | 10 | 9 | 9 | 10 | 9 | 9 | 10 | 9 | 9 | 10 | 9 | 9 | 10 | 9 | 9 |
| Example 57 | 10 | 9 | 9 | 10 | 9 | 9 | 10 | 9 | 9 | 10 | 9 | 9 | 10 | 9 | 9 | 10 | 9 | 9 |
| Example 58 | 10 | 9 | 9 | 10 | 9 | 9 | 10 | 9 | 9 | 10 | 9 | 9 | 10 | 9 | 9 | 10 | 9 | 9 |
| Example 59 | 10 | 9 | 9 | 10 | 9 | 9 | 10 | 9 | 9 | 10 | 9 | 9 | 10 | 9 | 9 | 10 | 9 | 9 |
| Example 60 | 10 | 9 | 9 | 10 | 9 | 9 | 10 | 9 | 9 | 10 | 9 | 9 | 10 | 9 | 9 | 10 | 9 | 9 |
| Example 61 | 10 | 10 | 10 | 10 | 10 | 10 | 10 | 10 | 10 | 10 | 10 | 10 | 10 | 10 | 10 | 10 | 10 | 10 |
| Example 62 | 10 | 10 | 10 | 10 | 10 | 10 | 10 | 10 | 10 | 10 | 10 | 10 | 10 | 10 | 10 | 10 | 10 | 10 |
| Example 63 | 10 | 10 | 10 | 10 | 10 | 10 | 10 | 10 | 10 | 10 | 10 | 10 | 10 | 10 | 10 | 10 | 10 | 10 |
| Example 64 | 10 | 10 | 10 | 10 | 10 | 10 | 10 | 10 | 10 | 10 | 10 | 10 | 10 | 10 | 10 | 10 | 10 | 10 |
| Comparative Example 1 | 4 | 3 | 2 | 4 | 3 | 2 | 4 | 3 | 2 | 4 | 3 | 2 | 4 | 3 | 2 | 4 | 3 | 2 |

TABLE 4-7-continued

|  | All-in-one gel | | | | | | Foundation primer | | | | | | Lip primer | | | | | |
| --- | --- | --- | --- | --- | --- | --- | --- | --- | --- | --- | --- | --- | --- | --- | --- | --- | --- | --- |
|  | Spreading | | | Hardness | | | Spreading | | | Hardness | | | Spreading | | | Hardness | | |
|  | (1) | (2) | (3) | (1) | (2) | (3) | (1) | (2) | (3) | (1) | (2) | (3) | (1) | (2) | (3) | (1) | (2) | (3) |
| Comparative Example 2 | 4 | 3 | 2 | 4 | 3 | 2 | 4 | 3 | 2 | 4 | 3 | 2 | 4 | 3 | 2 | 4 | 3 | 2 |
| Comparative Example 3 | 5 | 3 | 3 | 5 | 3 | 3 | 5 | 3 | 3 | 5 | 3 | 3 | 5 | 3 | 3 | 5 | 3 | 3 |
| Comparative Example 4 | 5 | 3 | 3 | 5 | 3 | 3 | 5 | 3 | 3 | 5 | 3 | 3 | 5 | 3 | 3 | 5 | 3 | 3 |
| Comparative Example 5 | 5 | 4 | 3 | 5 | 4 | 3 | 5 | 4 | 3 | 5 | 4 | 3 | 5 | 4 | 3 | 5 | 4 | 3 |
| Comparative Example 6 | 5 | 4 | 3 | 5 | 4 | 3 | 5 | 4 | 3 | 5 | 4 | 3 | 5 | 4 | 3 | 5 | 4 | 3 |
| Comparative Example 7 | 5 | 4 | 4 | 5 | 4 | 4 | 5 | 4 | 4 | 5 | 4 | 4 | 5 | 4 | 4 | 5 | 4 | 4 |
| Comparative Example 8 | 5 | 4 | 4 | 5 | 4 | 4 | 5 | 4 | 4 | 5 | 4 | 4 | 5 | 4 | 4 | 5 | 4 | 4 |
| Comparative Example 9 | 4 | 3 | 2 | 4 | 3 | 2 | 4 | 3 | 2 | 4 | 3 | 2 | 4 | 3 | 2 | 4 | 3 | 2 |
| Comparative Example 10 | 4 | 3 | 2 | 4 | 3 | 2 | 4 | 3 | 2 | 4 | 3 | 2 | 4 | 3 | 2 | 4 | 3 | 2 |
| Comparative Example 11 | 5 | 3 | 3 | 5 | 3 | 3 | 5 | 3 | 3 | 5 | 3 | 3 | 5 | 3 | 3 | 5 | 3 | 3 |
| Comparative Example 12 | 5 | 3 | 3 | 5 | 3 | 3 | 5 | 3 | 3 | 5 | 3 | 3 | 5 | 3 | 3 | 5 | 3 | 3 |
| Comparative Example 13 | 4 | 3 | 2 | 4 | 3 | 2 | 4 | 3 | 2 | 4 | 3 | 2 | 4 | 3 | 2 | 4 | 3 | 2 |
| Comparative Example 14 | 5 | 3 | 3 | 5 | 3 | 3 | 5 | 3 | 3 | 5 | 3 | 3 | 5 | 3 | 3 | 5 | 3 | 3 |
| Comparative Example 15 | 5 | 3 | 3 | 5 | 3 | 3 | 5 | 3 | 3 | 5 | 3 | 3 | 5 | 3 | 3 | 5 | 3 | 3 |

TABLE 4-8

|  | Body powder | | | | | | Solid powder eyeshadow | | | | | |
| --- | --- | --- | --- | --- | --- | --- | --- | --- | --- | --- | --- | --- |
|  | Spreading | | | Hardness | | | Spreading | | | Hardness | | |
|  | (1) | (2) | (3) | (1) | (2) | (3) | (1) | (2) | (3) | (1) | (2) | (3) |
| Example 44 | 10 | 9 | 9 | 10 | 9 | 9 | 10 | 9 | 9 | 10 | 9 | 9 |
| Example 45 | 10 | 9 | 9 | 10 | 9 | 9 | 10 | 9 | 9 | 10 | 9 | 9 |
| Example 46 | 10 | 9 | 9 | 10 | 9 | 9 | 10 | 9 | 9 | 10 | 9 | 9 |
| Example 47 | 10 | 9 | 9 | 10 | 9 | 9 | 10 | 9 | 9 | 10 | 9 | 9 |
| Example 48 | 10 | 9 | 9 | 10 | 9 | 9 | 10 | 9 | 9 | 10 | 9 | 9 |
| Example 49 | 10 | 9 | 9 | 10 | 9 | 9 | 10 | 9 | 9 | 10 | 9 | 9 |
| Example 50 | 10 | 9 | 9 | 10 | 9 | 9 | 10 | 9 | 9 | 10 | 9 | 9 |
| Example 51 | 9 | 8 | 8 | 9 | 8 | 8 | 9 | 8 | 8 | 9 | 8 | 8 |
| Example 52 | 10 | 9 | 9 | 10 | 9 | 9 | 10 | 9 | 9 | 10 | 9 | 9 |
| Example 53 | 9 | 8 | 8 | 9 | 8 | 8 | 9 | 8 | 8 | 9 | 8 | 8 |
| Example 54 | 10 | 9 | 9 | 10 | 9 | 9 | 10 | 9 | 9 | 10 | 9 | 9 |
| Example 55 | 10 | 9 | 9 | 10 | 9 | 9 | 10 | 9 | 9 | 10 | 9 | 9 |
| Example 56 | 10 | 9 | 9 | 10 | 9 | 9 | 10 | 9 | 9 | 10 | 9 | 9 |
| Example 57 | 10 | 9 | 9 | 10 | 9 | 9 | 10 | 9 | 9 | 10 | 9 | 9 |
| Example 58 | 10 | 9 | 9 | 10 | 9 | 9 | 10 | 9 | 9 | 10 | 9 | 9 |
| Example 59 | 10 | 9 | 9 | 10 | 9 | 9 | 10 | 9 | 9 | 10 | 9 | 9 |
| Example 60 | 10 | 9 | 9 | 10 | 9 | 9 | 10 | 9 | 9 | 10 | 9 | 9 |
| Example 61 | 10 | 10 | 10 | 10 | 10 | 10 | 10 | 10 | 10 | 10 | 10 | 10 |
| Example 62 | 10 | 10 | 10 | 10 | 10 | 10 | 10 | 10 | 10 | 10 | 10 | 10 |
| Example 63 | 10 | 10 | 10 | 10 | 10 | 10 | 10 | 10 | 10 | 10 | 10 | 10 |
| Example 64 | 10 | 10 | 10 | 10 | 10 | 10 | 10 | 10 | 10 | 10 | 10 | 10 |
| Comparative Example 1 | 4 | 3 | 2 | 4 | 3 | 2 | 4 | 3 | 2 | 4 | 3 | 2 |
| Comparative Example 2 | 4 | 3 | 2 | 4 | 3 | 2 | 4 | 3 | 2 | 4 | 3 | 2 |
| Comparative Example 3 | 5 | 3 | 3 | 5 | 3 | 3 | 5 | 3 | 3 | 5 | 3 | 3 |
| Comparative Example 4 | 5 | 3 | 3 | 5 | 3 | 3 | 5 | 3 | 3 | 5 | 3 | 3 |
| Comparative Example 5 | 5 | 4 | 3 | 5 | 4 | 3 | 5 | 4 | 3 | 5 | 4 | 3 |
| Comparative Example 6 | 5 | 4 | 3 | 5 | 4 | 3 | 5 | 4 | 3 | 5 | 4 | 3 |
| Comparative Example 7 | 5 | 4 | 4 | 5 | 4 | 4 | 5 | 4 | 4 | 5 | 4 | 4 |
| Comparative Example 8 | 5 | 4 | 4 | 5 | 4 | 4 | 5 | 4 | 4 | 5 | 4 | 4 |
| Comparative Example 9 | 4 | 3 | 2 | 4 | 3 | 2 | 4 | 3 | 2 | 4 | 3 | 2 |
| Comparative Example 10 | 4 | 3 | 2 | 4 | 3 | 2 | 4 | 3 | 2 | 4 | 3 | 2 |
| Comparative Example 11 | 5 | 3 | 3 | 5 | 3 | 3 | 5 | 3 | 3 | 5 | 3 | 3 |
| Comparative Example 12 | 5 | 3 | 3 | 5 | 3 | 3 | 5 | 3 | 3 | 5 | 3 | 3 |
| Comparative Example 13 | 4 | 3 | 2 | 4 | 3 | 2 | 4 | 3 | 2 | 4 | 3 | 2 |
| Comparative Example 14 | 5 | 3 | 3 | 5 | 3 | 3 | 5 | 3 | 3 | 5 | 3 | 3 |
| Comparative Example 15 | 5 | 3 | 3 | 5 | 3 | 3 | 5 | 3 | 3 | 5 | 3 | 3 |

From these results, it can be seen that the cosmetics of the Examples, compared with the cosmetics of the Comparative Examples, may be superior in spreading and hardness and may experience only a limited decrease in spreadability and hardness even when exposed to a strongly acidic or strongly alkaline environment.

For these reasons, the cellulosic particles of the Examples, compared with the cellulosic particles of the Comparative Examples, may provide cellulosic particles that have high flexibility and experience only a limited loss of flexibility even when exposed to a strongly acidic or strongly alkaline environment.

It can also be seen that the cellulosic particles of the Examples may also have high biodegradability.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
A cellulosic particle containing:
cellulose as a base constituent, wherein:
a percentage water absorption of the cellulosic particle measured by method B in ISO 15512:1999 is 11% or more and 20% or less.

(((2)))
The cellulosic particle according to (((1))), wherein:
a percentage weight loss of the cellulosic particle after standing in a 28° C. and 85% RH environment for 3 days and subsequent vacuum-drying at 100° C. for 1 hour is 18% or more and 25% or less.

(((3)))
The cellulosic particle according to (((1))) or (((2))), wherein:
the cellulosic particle has:
a core particle containing the cellulose as a base constituent; and
a coating layer covering the core particle and containing at least one selected from the group consisting of a fatty acid, a fatty acid metallic salt, and an amino acid compound.

(((4)))
The cellulosic particle according to (((3))), wherein:
the fatty acid is a fatty acid having 16 or more and 22 or fewer carbon atoms; and
a number of carbon atoms in the fatty acid metallic salt is 16 or more and 22 or fewer.

(((5)))
The cellulosic particle according to (((3))) or (((4))), wherein:
the fatty acid is a saturated fatty acid; and the fatty acid metallic salt is a saturated fatty acid metallic salt.

(((6)))
The cellulosic particle according to any one of (((3))) to (((5))), wherein:
the cellulosic particle has an intermediate layer between the core particle and the coating layer; and
the intermediate layer contains at least one selected from the group consisting of a polyamine compound, a polyquaternium, a polysaccharide compound, and a polyacrylic acid.

(((7)))
The cellulosic particle according to any one of (((1))) to (((6))), wherein:
an inorganic particle as an external additive is present on the cellulosic particle.

(((8)))
The cellulosic particle according to any one of (((1))) to (((7))), wherein:
a volume-average particle diameter of the cellulosic particles is 3 μm or more and less than 10 μm.

(((9)))
The cellulosic particle according to any one of (((1))) to (((8))), wherein:
an upper geometric standard deviation by number GSDv of the cellulosic particles is 1.0 or greater and 1.7 or less.

(((10)))
The cellulosic particle according to any one of (((1))) to (((9))), wherein:
sphericity of the cellulosic particle is 0.7 or greater.

(((11)))
The cellulosic particle according to any one of (((1))) to (((10))), wherein:
surface smoothness of the cellulosic particle is 50% or more.

(((12)))
The cellulosic particle according to any one of (((1))) to (((11))), wherein:
a number-average molecular weight of the cellulose is 37000 or more.

(((13)))
The cellulosic particle according to (((12))), wherein:
the number-average molecular weight of the cellulose is 45000 or more.

What is claimed is:

1. A cellulosic particle comprising:
a core particle containing cellulose as a base constituent, wherein the cellulose as the base constituent is whereby a cellulose content relative to the core particle is 90% by mass or more; and
a coating layer covering the core particle and containing at least one selected from the group consisting of a fatty acid, a fatty acid metallic salt, and an amino acid compound, and wherein:
a percentage water absorption of the cellulosic particle measured by method B in ISO 15512:1999 is 11% or more and 20% or less.

2. The cellulosic particle according to claim 1, wherein:
a percentage weight loss of the cellulosic particle after standing in a 28° C. and 85% RH environment for 3 days and subsequent vacuum-drying at 100° C. for 1 hour is 18% or more and 25% or less.

3. The cellulosic particle according to claim 2, wherein:
an upper geometric standard deviation by number GSDv of the cellulosic particles is 1.0 or greater and 1.7 or less.

4. The cellulosic particle according to claim 1, wherein:
the fatty acid is a fatty acid having 16 or more and 22 or fewer carbon atoms; and
a number of carbon atoms in the fatty acid metallic salt is 16 or more and 22 or fewer.

5. The cellulosic particle according to claim 1, wherein:
the fatty acid is a saturated fatty acid; and
the fatty acid metallic salt is a saturated fatty acid metallic salt.

6. The cellulosic particle according to claim 1, wherein:
the cellulosic particle has an intermediate layer between the core particle and the coating layer; and
the intermediate layer contains at least one selected from the group consisting of a polyamine compound, a polyquaternium, a polysaccharide compound, and a polyacrylic acid.

7. The cellulosic particle according to claim 1, wherein:
an inorganic particle as an external additive is present on the cellulosic particle.

8. The cellulosic particle according to claim 1, wherein:
a volume-average particle diameter of the cellulosic particles is 3 μm or more and less than 10 μm.

9. The cellulosic particle according to claim 1, wherein:
an upper geometric standard deviation by number GSDv of the cellulosic particles is 1.0 or greater and 1.7 or less.

10. The cellulosic particle according to claim 1, wherein:
sphericity of the cellulosic particle is 0.7 or greater.

11. The cellulosic particle according to claim 1, wherein:
surface smoothness of the cellulosic particle is 50% or more.

12. The cellulosic particle according to claim 1, wherein:
a number-average molecular weight of the cellulose is 37000 or more.

13. The cellulosic particle according to claim 12, wherein:
the number-average molecular weight of the cellulose is 45000 or more.

\* \* \* \* \*